United States Patent
Wilkinson et al.

(10) Patent No.: US 12,117,987 B2
(45) Date of Patent: *Oct. 15, 2024

(54) METHODS AND APPARATUS FOR EFFICIENT MEDIA INDEXING

(71) Applicant: Gracenote, Inc., Emeryville, CA (US)

(72) Inventors: Matthew James Wilkinson, Emeryville, CA (US); Jeffrey Scott, Berkeley, CA (US); Robert Coover, Orinda, CA (US); Konstantinos Antonios Dimitriou, San Francisco, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,616

(22) Filed: Nov. 16, 2023

(65) Prior Publication Data
US 2024/0086385 A1    Mar. 14, 2024

Related U.S. Application Data

(63) Continuation of application No. 17/688,632, filed on Mar. 7, 2022, now Pat. No. 11,874,814, which is a (Continued)

(30) Foreign Application Priority Data

Sep. 6, 2018  (GR) .............................. 20180100409

(51) Int. Cl.
*G06F 16/22*  (2019.01)
*G06F 7/58*  (2006.01)
*G06F 16/41*  (2019.01)

(52) U.S. Cl.
CPC .......... *G06F 16/2255* (2019.01); *G06F 16/41* (2019.01); *G06F 7/588* (2013.01)

(58) Field of Classification Search
None
See application file for complete search history.

(56) References Cited

U.S. PATENT DOCUMENTS

| | | | |
|---|---|---|---|
| 6,307,938 B1 | 10/2001 | Matyas, Jr. et al. | |
| 8,082,359 B2 | 12/2011 | Chauhan | |
| 8,086,842 B2 | 12/2011 | Sidhu et al. | |
| 8,184,953 B1 | 5/2012 | Covell et al. | |

(Continued)

FOREIGN PATENT DOCUMENTS

| | | |
|---|---|---|
| KR | 20090015026 | 2/2009 |
| WO | 2010104902 | 9/2010 |
| WO | 2020051332 | 3/2020 |

OTHER PUBLICATIONS

Six, Joren, Federica Bressan, and Marc Leman. "A case for reproduciblity in MIR: replication of 'a highly robust audio fingerprinting system'." Transactions of the International Society for Music Information Retrieval 1.1 (2018): 56-67. (Year: 2018).*

(Continued)

*Primary Examiner* — Uyen T Le
(74) *Attorney, Agent, or Firm* — McDonnell Boehnen Hulbert & Berghoff LLP

(57) ABSTRACT

Methods, apparatus, systems and articles of manufacture are disclosed for efficient media indexing. An example method disclosed herein includes means for initiating a list of hash seeds, the list of hash seeds including at least a first hash seed value and a second hash seed value among other hash seed values, means for generating to generate a first bucket distribution based on the first hash seed value and a first hash function and generate a second bucket distribution based on the second hash seed value used in combination with the first hash seed value, means for determining to determine a first entropy value of the first bucket distribution, wherein data associated with the first bucket distribution is stored in a first hash table and determine a second entropy value of the second bucket distribution.

20 Claims, 16 Drawing Sheets

Related U.S. Application Data continuation of application No. 16/561,908, filed on Sep. 5, 2019, now Pat. No. 11,269,840.

(60) Provisional application No. 62/727,908, filed on Sep. 6, 2018.

(56) References Cited

U.S. PATENT DOCUMENTS

| | | | |
|---|---|---|---|
| 8,712,216 | B1 | 4/2014 | Covell et al. |
| 8,782,012 | B2 | 7/2014 | Fusco et al. |
| 9,236,056 | B1 | 1/2016 | Daskalolv et al. |
| 9,311,403 | B1 | 4/2016 | Ioffe |
| 2004/0199533 | A1* | 10/2004 | Celis .................. G06F 16/2255 |
| 2007/0005556 | A1 | 1/2007 | Ganti et al. |
| 2007/0274523 | A1* | 11/2007 | Rhoads .................. G07F 17/16 704/E19.009 |
| 2008/0307189 | A1 | 12/2008 | Mityagin et al. |
| 2009/0277322 | A1 | 11/2009 | Cai et al. |
| 2010/0040066 | A1* | 2/2010 | Hao ........................ H04L 45/00 370/395.31 |
| 2010/0104902 | A1 | 4/2010 | Ogawa et al. |
| 2012/0136846 | A1 | 5/2012 | Song et al. |
| 2013/0031643 | A1* | 1/2013 | Rogel ..................... G06F 21/10 726/29 |
| 2013/0046767 | A1 | 2/2013 | Lee et al. |
| 2013/0204905 | A1 | 8/2013 | Ioffe |
| 2013/0265883 | A1 | 10/2013 | Henry et al. |
| 2016/0124716 | A1 | 5/2016 | Venkata et al. |
| 2017/0300592 | A1 | 10/2017 | Breslow et al. |
| 2018/0300592 | A1 | 10/2018 | Jin et al. |
| 2019/0057118 | A1 | 2/2019 | Appikatala et al. |
| 2019/0095493 | A1 | 3/2019 | Bhattacharjee et al. |
| 2020/0293696 | A1 | 9/2020 | Motwani et al. |

OTHER PUBLICATIONS

Beauget, Sylvain, Michiel van der Veen, and Aweke Lemma. "Informed detection of audio watermark for resolving playback speed modifications." Proceedings of the 2004 Workshop on Multimedia and Security. 2004. (Year: 2004).*

International Searching Authority, "International Preliminary Report on Patentability", issued in connection with International Application No. PCT/US2019/049747, dated Mar. 9, 2021, 5 pages.

International Search Authority, "International Search Report", issued in connection with International Application No. PCT/US2019/049747, dated Dec. 23, 2019, 3 pages.

International Search Authority, "Written Opinion", issued in connection with International Application No. PCT/US2019/049747, dated Dec. 23, 2019, 4 pages.

United States Patent and Trademark Office, "Non-Final Office Action", issued in connection with U.S. Appl. No. 16/561,908, Jun. 24, 2021, 11 pages.

United States Patent and Trademark Office, "Notice of Allowance and Fee(s) Due", issued in connection with U.S. Appl. No. 16/561,908, Oct. 29, 2021, 9pages.

Wikipedia, "Enthropy (information theory)," last modified Aug. 13, 2018, retrieved from [https://en.wikipedia. org/w/index.php?title=Entroph_(information_theory)&oldid=854761204], 14 pages.

Leskovec, et al., "Finding Similar Items," Mining of Massive Datasets, Chapter 3, published online Dec. 5, 2014, 58 pages.

Leskovec, et al., "Finding Similar Items: Locality Sensitive Hashing," retrieved from [http://www.mmds.org/#book] on Jul. 20, 2022, Mining of Massive Datasets, Chapter 3 presentation, 59 pages.

Liu, et al., "Instant mobile video search with layered audio-video indexing and progressive transmission." IEEE Transactions on Multimedia 16.8 (2014): 2242-2255 (2014).

Tarkoma, et al., "Theory and practice of bloom filters for distributed systems", IEEE Communications Surveys & Tutorials 14.1 (2011):131-155. (Year 2011).

Resch, J., New Hashing Algorithms for Data Storage, In Cleversafe, Storage Developer Conference, SNIA, Santa Clara (Sep. 2015).

Wang, et al., "Investigating memory optimization of has-index for next generation sequencing on multi-core architecture." 2012 IEEE 26th International Parallel and Distributed Processing Symposium Workshops & PhD Forum., IEEE, 2012, 10 pages.

* cited by examiner

| PEAK VALUES | H1(X) | H2(X) | H3(X) |
|---|---|---|---|
| X1 = 100 | 3465648511 | 2025647715 | 2847617507 |
| X2 = 106 | 1662401307 | 147474698 | 1649774025 |
| X3 = 286 | 67661031 | 978735960 | 37254053 |
| X4 = 493 | 916761720 | 1750732839 | 1526093743 |
| X5 = 573 | 2105481358 | 1456782761 | 2463244055 |
| X6 = 627 | 2444182571 | 1834486290 | 1556564791 |
| X7 = 849 | 996734810 | 3844289543 | 1175397309 |
| X8 = 853 | 3255270357 | 3533237125 | 72028602 |
| X9 = 911 | 1721119605 | 2704128895 | 830009291 |
| X10 = 930 | 3047019407 | 2809856719 | 4276230722 |
| X11 = 1035 | 2859677685 | 1150581258 | 3267033898 |
| X12 = 1380 | 3115882335 | 3344157811 | 2073523636 |
| X13 = 1399 | 2151167342 | 1390096790 | 580483197 |
| X14 = 1539 | 489833442 | 2693237836 | 2740216591 |
| X15 = 1793 | 2280962776 | 4015513306 | 1510453199 |
| X16 = 1800 | 3376636344 | 1561073590 | 1786779227 |
| X17 = 1830 | 1821693279 | 4204902254 | 3491821460 |
| X18 = 1824 | 2304045967 | 1060346137 | 3997214802 |
| X19 = 1855 | 1787663765 | 431830552 | 3933252951 |
| X20 = 1954 | 2765051265 | 1108654745 | 114663662 |
| MIN. SUBHASH VALUE | 67661031 | 147474698 | 72028602 |
| CORRESPONDING PEAK: | X3 (286) | X2 (106) | X8 (853) |
| TRIPLET | 67660131, 147474698, 37254053 | | |
| GLOBAL HASH VALUE | 3238967728 | | |

FIG. 12

METHODS AND APPARATUS FOR EFFICIENT MEDIA INDEXING

RELATED APPLICATION

This patent arises from a continuation of U.S. patent application Ser. No. 16/561,908 filed Sep. 5, 2019, which arises from an application claiming the benefit of Greek Patent Application Serial No. 20180100409, which was filed on Sep. 6, 2018, and U.S. Provisional Patent Application Ser. No. 62/727,908, which was filed on Sep. 6, 2018. Greek Patent Application Serial No. 20180100409 and U.S. Provisional Patent Application Ser. No. 62/727,908 are hereby incorporated herein by reference in their entirety. Priority to Greek Patent Application Serial No. 20180100409, U.S. Provisional Patent Application Ser. No. 62/727,908, and U.S. patent application Ser. No. 16/561,908 is hereby claimed.

FIELD OF THE DISCLOSURE

This disclosure relates generally to data analysis, and, more particularly, to methods and apparatus for efficient media indexing.

BACKGROUND

In recent years, significantly increased quantities of data need to be stored and/or retrieved at faster speeds. For example, audio information (e.g., sounds, speech, music, or any suitable combination thereof) may be represented as digital data (e.g., electronic, optical, or any suitable combination thereof). For example, a piece of music, such as a song, may be represented by audio data, and such audio data may be stored, temporarily or permanently, as all or part of a file (e.g., a single-track audio file or a multi-track audio file). Some techniques enable comparison of unknown audio information (e.g., an unidentified recording) with known audio information (e.g., a recording for which a title, track, etc., is known). Such techniques require fast comparison of the unknown audio information with vast quantities of data corresponding to known audio information.

BRIEF DESCRIPTION OF THE DRAWINGS

FIG. 12 is a table representative of an example dataset associated with the procedure of FIG. 11.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
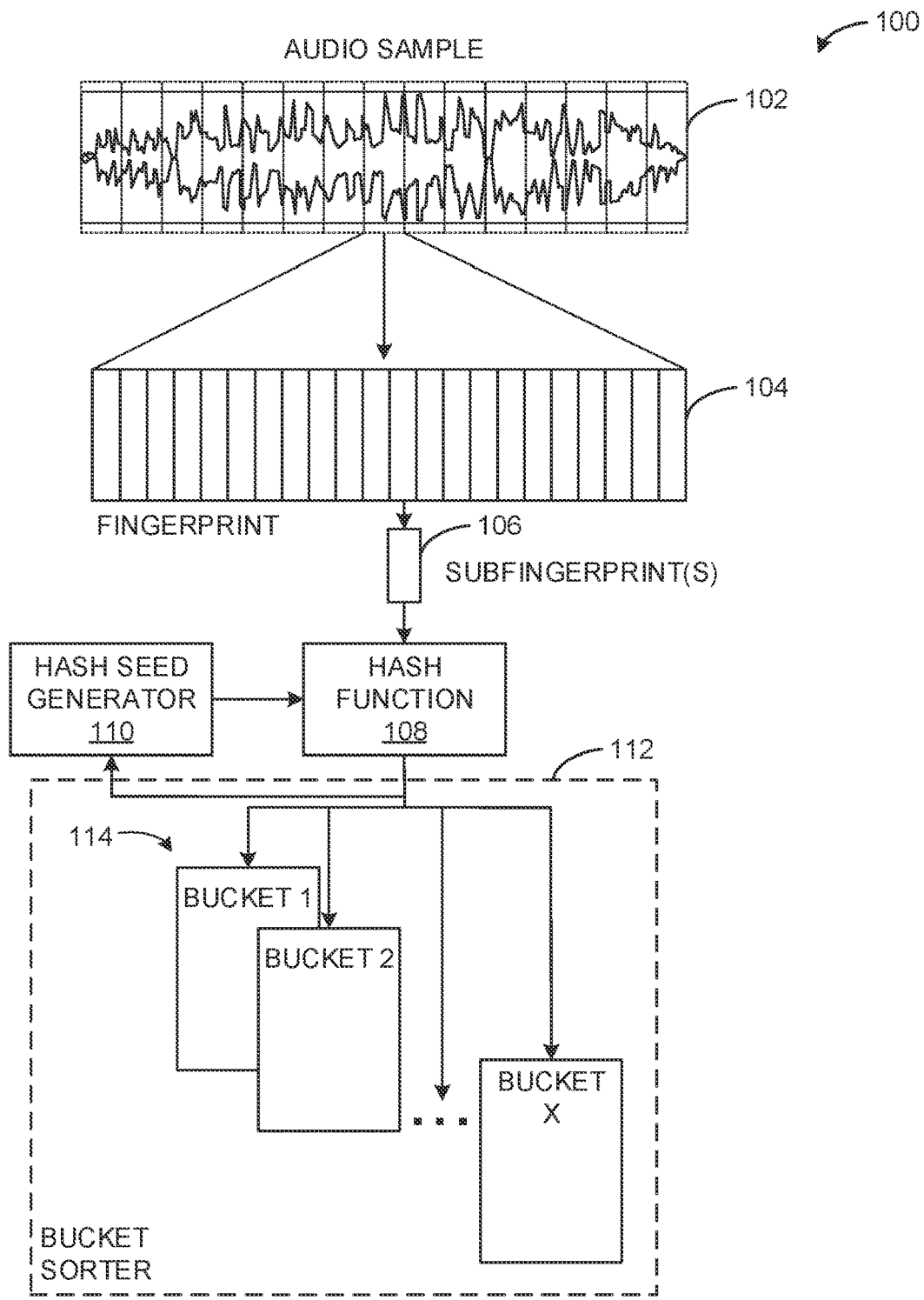
FIG. 1 is an example schematic of a hash seed generator in communication with a hash function and a bucket sorter to store data associated with an audio sample to a plurality of buckets and/or indices in accordance with the teachings of this disclosure.

Indices and/or buckets may be utilized to store references to data for audio fingerprinting techniques. Fingerprint-based media monitoring generally involves determining (e.g., generating and/or collecting) fingerprint(s), also referred to as signature(s), representative of a media signal (e.g., an audio signal and/or a video signal) output by a monitored media device and comparing the monitored fingerprints(s) to one or more references fingerprints corresponding to known (e.g., reference) media sources. Various comparison criteria, such as a cross-correlation value, a Hamming distance, etc., can be evaluated to determine whether a monitored fingerprint matches a particular reference fingerprint.

When a match between the monitored fingerprint and one of the reference fingerprints is found, the monitored media can be identified as corresponding to the particular reference media represented by the reference fingerprint that matched the monitored fingerprint. Because attributes, such as an identifier of the media, a presentation time, a broadcast channel, etc., are collected for the reference fingerprint, these attributes may be associated with the monitored media whose monitored fingerprint matched the reference fingerprint.

Some prior systems store audio fingerprints, or portions thereof (e.g., a subfingerprint), at one or more indices and/or buckets included in a hash table based on processing the audio fingerprints, or portions thereof, with a hash algorithm. In some instances, prior systems determined peak values for subfingerprints and then input these peak values (e.g., peak characteristics of the audio signal) into hash functions based on one or more pre-selected hash seeds. In some examples, prior techniques selected these hash seeds by hand. In some examples, hash seeds were selected randomly.

However, in some examples, selection of sub-optimal hash seeds, along with similarities among characteristics of audio samples considered, can result in highly irregular hash table bucket distributions, meaning that some locations (e.g., buckets) in the hash table(s) store significantly different quantities of data at these locations than other locations. In such examples, highly irregular hash table bucket distributions can cause an increase in computational resources as well as search time required to retrieve a subfingerprint from a hash table due to buckets containing larger quantities of subfingerprints taking longer and more computing resources to search than buckets with small quantities of subfingerprints. Thus, promoting an even distribution of subfingerprints among buckets included in the hash table would result in both decreased search times as well as a decrease in computational resources required to complete the search.

Techniques disclosed herein utilize a computing system to calculate a value of entropy associated with a distribution of subfingerprints among buckets included in the hash table to determine a hash seed and/or a combination of hash seeds to be used in the hash seeding process. In such examples, the entropy value is associated with a uniformity of the distribution of subfingerprints. In some examples, a higher entropy value is correlated with an increase in the uniformity of the distribution of the subfingerprints and a lower entropy value is correlated with a decrease in the uniformity of the distribution of the subfingerprints. Thus, in techniques disclosed herein, hash seeds and/or combinations of hash seeds are selected to increase observed values of entropy.

In some examples, a computing system (e.g., the same computing system used to compute the entropy value, a different computing system, etc.) can be configured to perform a subfingerprint lookup by identifying candidate matches to a query for the subfingerprint in one or more hash indices. The hash indices storing data corresponding to subfingerprints (e.g., hash values corresponding to subfingerprints) can be generated via a seed and/or combination of seeds selected based on the selected seed and/or combinations of seeds providing a distribution of subfingerprints assigned to respective indexes having a greater entropy value than respective entropy values of the other seeds or seed combinations.

FIG. 1 is an example schematic 100 depicting an example hash seed generator 110 used to seed an example hash function 108 to distribute data associated with an audio sample to an example plurality of buckets 114 in accordance with the teachings of this disclosure. The schematic 100 includes an example audio sample 102, an example fingerprint 104, an example subfingerprint 106, the example hash function 108, the example hash seed generator 110, an example bucket sorter 112, and the example plurality of buckets 114.

The example audio sample 102 of the illustrated example of FIG. 1 is a segment of an audio recording. For example, the audio sample 102 can be a brief segment of a song, a speech, a concert, etc. The audio sample 102 can be represented by a plurality of fingerprints (e.g., indicated by the dashed rectangles over the audio sample), including the fingerprint 104. The example fingerprint 104 of the illustrated example of FIG. 1 is a representation of features of the audio sample 102. For example, the fingerprint 104 includes data representing characteristics of the audio sample 102 for the time frame of the fingerprint 104. For example, the fingerprint 104 may be a condensed digital summary of the audio sample 102, including a number of the highest output values, a number of the lowest output values, frequency values, other characteristics of the audio sample 102, etc. Fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

The example subfingerprint 106 of the illustrated example of FIG. 1 is a divided portion of the fingerprint 104. For example, the fingerprint 104 can be divided into a specified number of subfingerprints 106 (e.g., ten, fifty, one-hundred, etc.), which can then be processed individually.

The example bucket sorter 112 of the illustrated example of FIG. 1 processes the hash of the subfingerprint 106 as generated by the hash function 108. In some examples, the bucket sorter 112 executes instructions to store data associated with the subfingerprint 106 in one of the buckets 114 based on a hash value received from the hash function 108, where the hash value corresponds to a bucket location. In some examples, the hash function 108 passes outputted hash values to the hash seed generator 110 to compare data associated with the subfingerprint 106 against data stored in the plurality of buckets 114.

The example plurality of buckets 114 of the illustrated example of FIG. 1 are locations where a representation of the subfingerprint 106 is stored. In the illustrated example of FIG. 1, X (e.g., wherein X is equal to 8, X is equal to 18, etc.) buckets 114 are represented, but any number of buckets 114 may be utilized. In some examples, ones of the plurality of buckets 114 are associated with different hash values (or ranges of hash values) that are used to assign the subfingerprint 106 to locations in the ones of the plurality of buckets 114. In some examples, ones of the plurality of buckets 114 are associated with different subhash functions that are used to determine sets of subhash values.

Figure 2:
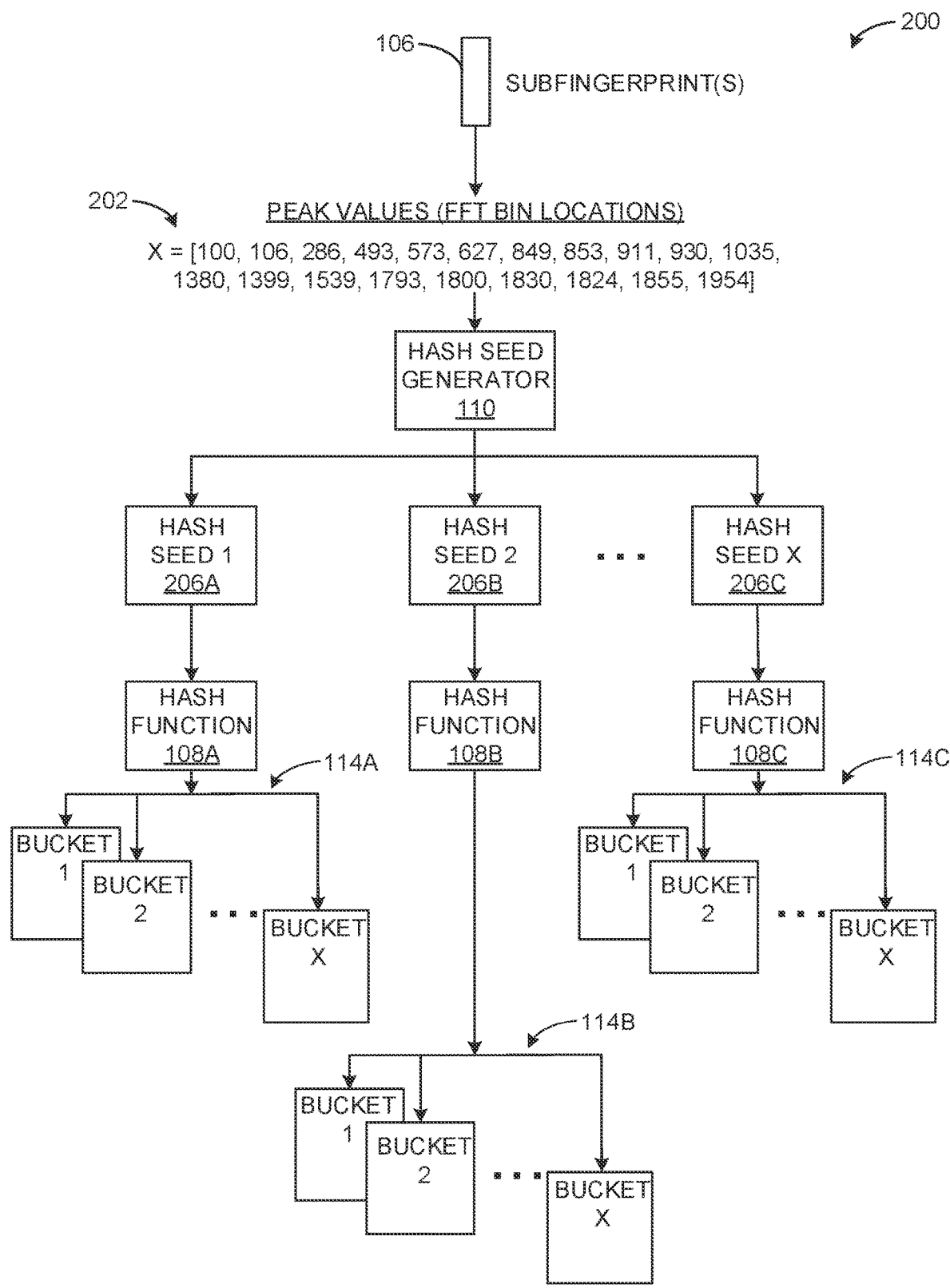
FIG. 2 is an illustration of a procedure to store an example subfingerprint from the schematic of FIG. 1 in multiple ones of the plurality of buckets of FIG. 1 based on a plurality of hash seeds output by the hash seed generator of FIG. 1.

FIG. 2 is an illustration of an example procedure 200 to store the subfingerprint 106 of the schematic 100 of FIG. 1 in one of the plurality of buckets 114 of FIG. 1. The example procedure begins by determining example values 202 (e.g., X=[100, 106, 286, 493, 573, 627, 849, 853, 911, 930, 1035, 1380, 1399, 1539, 1793, 1800, 1830, 1824, 1855, 1954]) from the subfingerprint 106. The values 202, in some examples, are associated with maximum amplitude values of the audio represented by the subfingerprint 106. In some examples, the values 202 are the twenty most prominent values. In some examples, the values 202 represent any audio characteristics (frequency, amplitude, phase shift, etc.) that may be used to represent the audio associated with the subfingerprint 106. In some examples, the values 202 represent a combination of the most prominent values and values representing any other audio characteristic. In some examples, the audio of the subfingerprint 106 is run through a Fourier transform (e.g., a fast Fourier-transform, FFT), and then the values 202 are determined as the prominent (e.g., highest amplitude) features of the output of the transform. In the illustrated example of FIG. 2, twenty values are identified for the subfingerprint 106.

After determining the values 202, the values, along with hash seeds 206A, 206B, 206C are input into example hash functions 108A, 108B, 108C, respectively. In some examples, three (3) values 202 (e.g., a triplet) are inserted into each of the hash functions 108A, 108B, 108C. In such examples, each of the hash functions 108A, 108B, 108C may be associated with a respective index (e.g., hash function 108A associated with a first index, hash function 108B associated with a second index, hash function 108C associated with an $X^{th}$ index, etc.). Further in such examples, at least one of the function associated with the hash functions 108A, 108B, 108C, and/or the three (3) values 202 (e.g., the triplet) selected are based upon the corresponding hash seeds 206A, 206B, 206C. In some examples, the values 202 are input into the hash functions 108a-c and a triplet is selected based upon the ones of the values 202 which resulted in a minimum value (e.g., a minimum hash value or minhash value). A detailed procedure to store values (e.g., peak values) in a hash table and/or to query values against the hash table is illustrated and described in connection with FIGS. 10-14B.

In some examples, the hash functions 108A, 108B, 108C hash together the values of the respective triplet. Based on the hash value generated by the hash functions 108A, 108B, 108C (e.g., a first hash value associated with the hash function 108A, a second hash value associated with the hash function 108B, an $X^{th}$ hash value associated with the hash function 108C, etc.), the subfingerprint 106 will be placed in a bucket location associated with the hash value and an index associated with the respective one of the hash functions 108A, 108B, 108C. For example, the subfingerprint 106 associated with the hash function 108A (or a hash value corresponding to the subfingerprint 106) will be stored in association with one of the buckets 114A (associated with the first index) based upon the first hash value. Similarly, the subfingerprint 106 associated with the hash function 108B will be placed in one of buckets 114B (associated with the second index) based upon the second hash value. Similarly, the subfingerprint 106 associated with the hash function 108C will be placed in one of buckets 114C (associated with the $X^{th}$ index) based upon the $X^{th}$ hash value. Thus, in the illustrated example, the buckets 114A, the buckets 114B, and the buckets 114C are mutually exclusive relative to one another. In some examples, subfingerprints are stored in a plurality of indices utilizing different hash functions to enable efficient retrieval of similar content during querying based upon the unique combination of bucket locations for a particular fingerprint.

Figure 3:
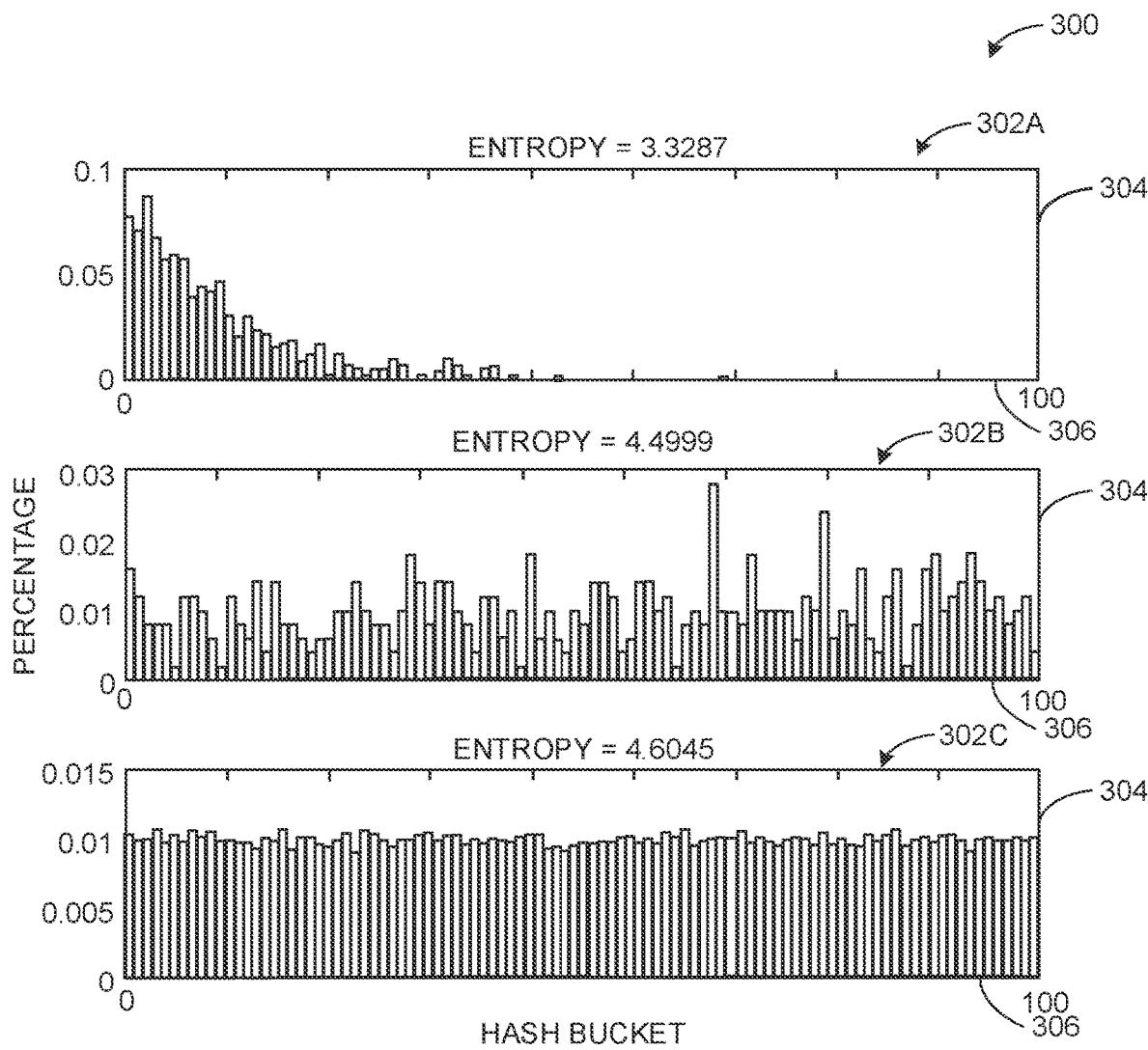
FIG. 3 is an illustration of plots showing distributions of subfingerprints stored in storage locations and entropy values corresponding to the distributions.

FIG. 3 is an illustration of plots 300 showing distributions of subfingerprints stored in storage locations and entropy values corresponding to the distributions. For example, FIG. 3 illustrates a first plot 302A, a second plot 302B, and a third plot 302C. Each of the plots includes a Y-axis 304 displaying a percentage of total subfingerprints stored in a given bucket (e.g., storage) locations and an X-axis 306 displaying the storage locations. As used herein, fingerprints are sometimes referred to as being stored in bucket locations. However, it is understood that fingerprints may be stored elsewhere (e.g., in a storage location separate from the one or more indices), and data associated with the fingerprints may be stored at the bucket locations. Therefore, the counts and/or percentages represented on the plots 300 indicate a quantity of fingerprints that are associated with (but may not necessarily be stored in) ones of the buckets.

Turning to the first plot 302A, a distribution of subfingerprints resulting in an entropy value of 3.3287 is displayed. Further in the first plot 302A, a majority of the subfingerprints are stored in the left most buckets as read on the page, yielding an uneven distribution of subfingerprints. For example, the first bucket includes approximately 7% of the total subfingerprints whereas the $100^{th}$ bucket includes approximately 0.1% of the total subfingerprints. Thus, the entropy of this distribution of subfingerprints between the buckets is relatively low.

Turning to the second plot 302B, a distribution of subfingerprints resulting in an entropy value of 4.4999 is displayed. In the second plot 302B, a more even distribution of subfingerprints in comparison to the first plot 302A is shown. However, in the second plot 302B, several of the buckets include a greater than average quantity of subfingerprints. For example, the $65^{th}$ bucket includes approximately 3% of the total subfingerprints. Thus, further uniformity of the distribution of the subfingerprints may be desired.

Turning to the third plot 302C, a distribution of subfingerprints resulting in an entropy value of 4.6045 is displayed. Thus, the third plot 302C displays a more even distribution of subfingerprints in comparison to the first plot 302A and the second plot 302B (e.g., based upon the increased entropy value). As shown in the third plot 302C, each of the one hundred buckets includes approximately 1% of the total quantity of subfingerprints and, thus, a substantially even distribution of the subfingerprints is displayed. When querying media fingerprints against the one or more indices represented in the plots 300, the distribution of subfingerprints represented in the third plot 302 may provide, on average, more efficient querying (e.g., less time to identify a matching subfingerprint or fingerprint). Therefore, seeding an index in a manner that results in a distribution with high entropy (e.g., as in the distribution represented in the third plot 302) is desired.

Figure 4:
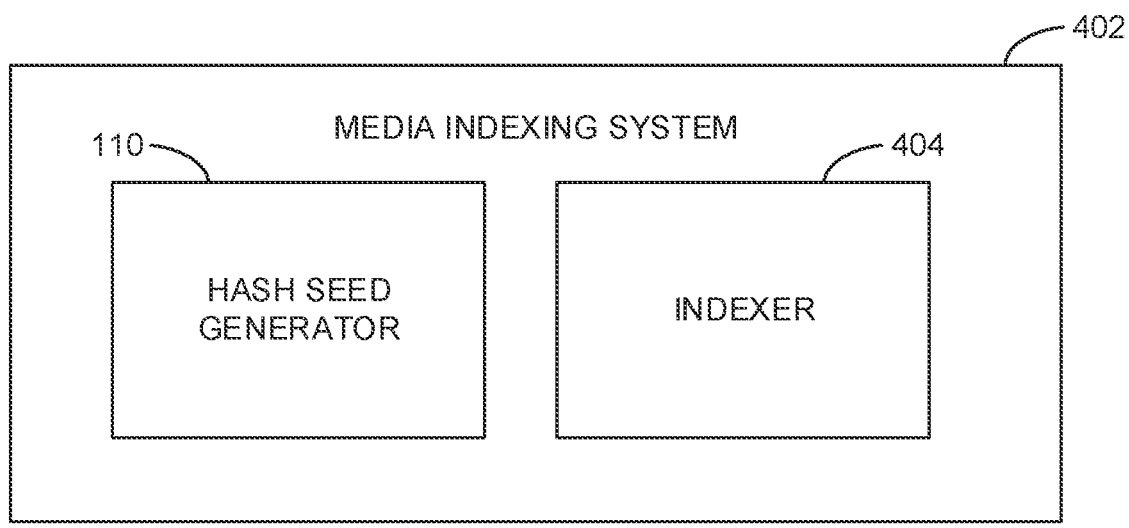
FIG. 4 is a block diagram of an example media indexing system constructed in accordance with the teachings of this disclosure.

FIG. 4 is a block diagram of an example media indexing system 402 constructed in accordance with the teachings of this disclosure. The media indexing system 400 includes the hash seed generator 110 and an example indexer 404. The hash seed generator 110 of the illustrated example of FIG. 4 is utilized to determine one or more hash seeds associated with one or more hash indices. Detail of the hash seed generator 110 is illustrated and described in further detail in FIG. 5. The example indexer 404 performs storage of media fingerprints or other data in the one or more indices, and/or querying of media fingerprints or other data against the one or more indices. In some examples, the indexer 404 accesses the hash seeds determined by the hash seed generator 110 to configure hash functions utilized during indexing procedures. Details of the indexer 404 are illustrated and described in further detail in FIGS. 10 and 13.

Figure 5:
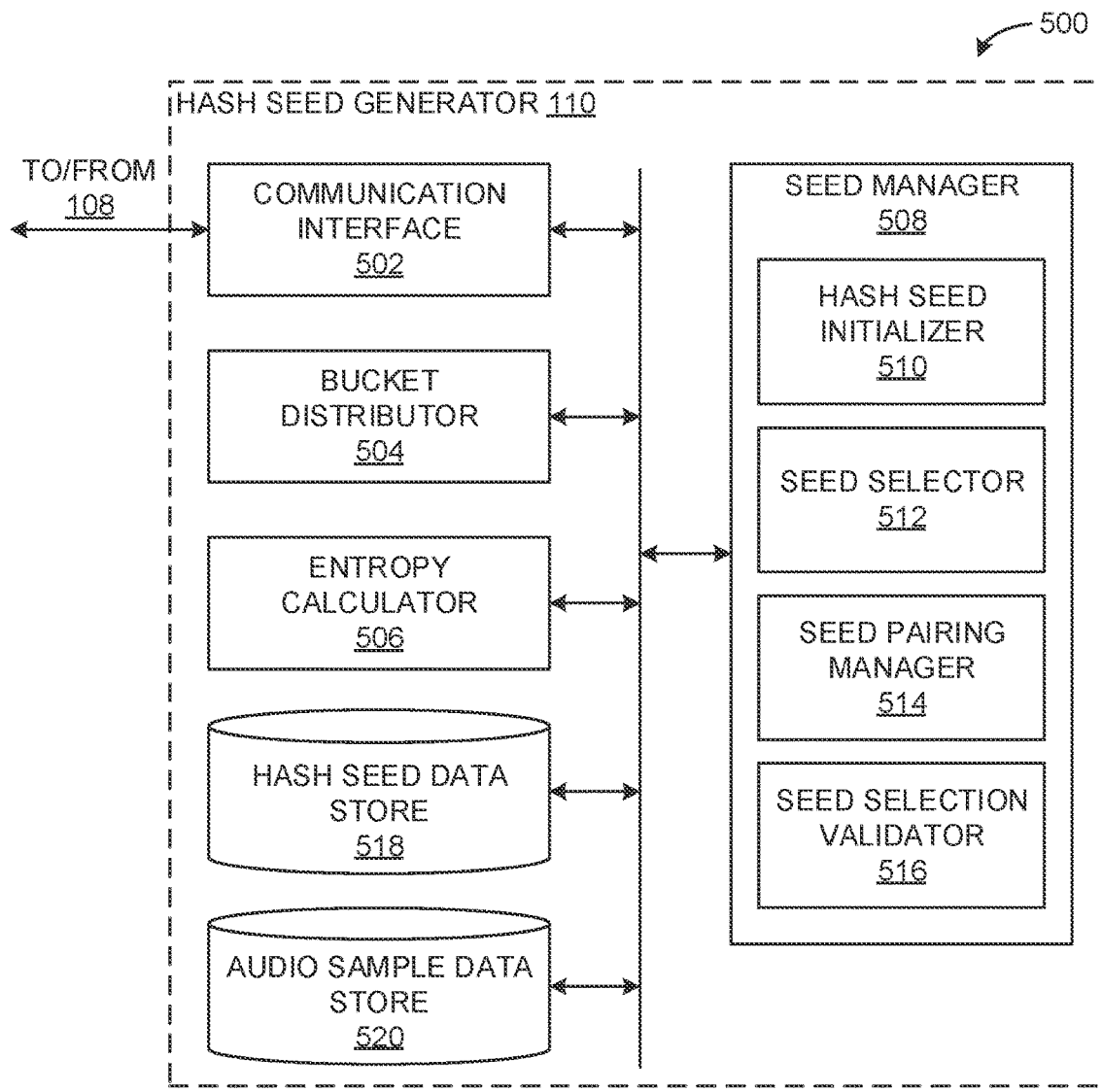
FIG. 5 is a block diagram of the hash seed generator of FIGS. 1 4, structured to execute the instructions of FIGS. 6-8 to perform hash seed selection for distribution of subfingerprints in storage locations in accordance with the teachings of this disclosure.

FIG. 5 is a block diagram of an example implementation 500 of the hash seed generator 110 of FIG. 1, disclosed herein, to generate one or more hash seeds based upon an entropy value associated with a distribution of subfingerprints 106 among buckets 114. The example hash seed generator 110 includes an example communication interface 502, an example bucket distributor 504, an example entropy calculator 506, and an example seed manager 508 which can, in some examples, further include an example hash seed initializer 510, an example seed selector 512, an example seed pairing manager 514, and an example seed selection validator 516.

The example communication interface 502 of the illustrated example of FIG. 5, included in or otherwise implemented by the hash seed generator 110, receives data from and/or distributes data to the hash function 108. In some examples, the communication interface 502 distributes one or more hash seeds to the hash function 108 and receives one or more determined bucket (e.g., storage) locations (e.g., one of the example buckets 114) for one or more subfingerprints (e.g., the example subfingerprint 106). The communication interface 502 is further capable of distributing received data to at least one of the bucket distributor 504, the entropy calculator 506, the seed manager 508, the hash seed data store 518, and/or the audio sample data store 520. For example, the communication interface 502 may distribute the determined bucket locations to the entropy calculator 506, among other communications.

The example bucket distributor 504 of the illustrated example of FIG. 5, included in or otherwise implemented by the hash seed generator 110, retrieves the example subfingerprint 106 including a plurality of values (e.g., values corresponding to FFT bin locations) via the communication interface 502. In some examples, the subfingerprint 106 is associated with the example fingerprint 104 which is further associated with the audio sample 102.

In some examples, the bucket distributor 504 can select three values of the values 202 corresponding to the FFT bin locations (e.g., a triplet) from the plurality of values. In some examples, the triplet values are selected based upon a first hash seed not yet considered for the example subfingerprint 106 (e.g., for example, the example hash seed 1 206A. If the example hash seed 1 206A has been considered, the example hash seed 2 206B is used, etc.). In some examples, the bucket distributor 504 arranges the three values of the triplet in an array (e.g., [100 930 1800], [286 1035 1824], etc.) and distributes the three values of the triplet to the hash function 108 via the communication interface 502, where the hash function 108 hashes the three values together. In some examples, the hash function 108 returns the generated hash to at least the hash seed generator 110 via the communication interface 502 and/or the bucket sorter 112.

In some examples, the bucket distributor 504 can determine a bucket location of the subfingerprint 106 considered in the respective index (e.g., the index equal to 1, 6, 14, etc.) based on the generated hash and a hash function. In some examples, the bucket distributor 504 can determine bucket locations for a plurality of subfingerprints based on a plurality of generated hashes. In some examples, the bucket distributor 504 can determine bucket locations based on hash values without actually storing data (e.g., without actually storing subfingerprints) in the buckets. In some such examples, a count can be stored to represent the number of items that would be stored in a bucket for subsequent use in determining a potential distribution of subfingerprints in buckets resulting from usage of one or more hash seeds. In some examples, the bucket distributor 504 uses a common hash function to determine bucket locations for peaks to be stored in an index. For example, the peaks may be determined based on the one or more hash seeds selected by the seed selector 512, and then the selected peaks to be utilized to represent the subfingerprint are input into a common hash function that can be utilized to compare the effectiveness (e.g., the resulting entropy) of using different hash values to select peaks.

The example entropy calculator 506 of the illustrated example of FIG. 5, included in or otherwise implemented by the hash seed generator 110, retrieves a plurality of buckets and/or bucket locations (e.g., the example buckets 114) associated with a first unanalyzed index and a corresponding quantity of subfingerprints (e.g., the example subfingerprint 106) stored in one or more of the plurality of buckets from the bucket distributor 504, respectively. In other examples, the example entropy calculator 506 can retrieve a plurality of triplets (e.g., arrayed triplets such as [100 930 1800], [286 1035 1824], etc.) associated with the first unanalyzed index.

Utilizing the retrieved buckets and corresponding quantities of subfingerprints and/or the plurality of triplets, the entropy calculator 506 determines an entropy value corresponding to the distribution of the subfingerprints among the bucket locations in the first unanalyzed index. In other examples, the entropy calculator 506 determines an entropy value associated with the triplet arrays determined by the bucket distributor 504 and the quantity of the occurrences of the values 202 in the triplet arrays (e.g., entropy is calculated for the input values of the hash function 108, not the output of the hash function 108).

In some examples, the entropy calculator 506 determines values (e.g., peak values) of a subfingerprint that are chosen when using particular hash seeds. In some examples, the entropy calculator 506 utilizes different hash functions for different indices when determining which peaks are selected using specific hash functions. In some such examples, the entropy calculator 506 inputs the selected values (e.g., peak values) into a common hash function and determines an entropy of the resulting distribution of data (e.g., subfingerprints) throughout the buckets. In some examples, the bucket distributor 504 determines counts of subfingerprints that would be associated with individual buckets, and the entropy calculator 506 determines entropy values for the distribution of subfingerprints between the buckets. By using common hash function in the last step before calculating the entropy value, the entropy calculator 506 can determine the entropy of the peaks that were selected by each hash seed and hash function combination. For example, if there are three indices, the entropy calculator 506 can determine a first set of peaks that are selected by using a first hash seed with a first hash function associated with the first index, a second set of peaks that are selected by using a second hash seed with a second hash function associated with the second index, and a third set of peaks that are selected by using a third hash seed with a third hash function associated with the third index. Then, the entropy calculator 506 can input the selected peaks from each of these indices into a common hash function and analyze the resulting bucket distribution.

In some examples, the entropy corresponds to a uniformity of the distribution of the subfingerprints. In such examples, an increase in entropy corresponds to an increase in the uniformity of the distribution and a decrease in entropy corresponds to a decrease in the uniformity of the buckets. Additionally, in some examples, the entropy calculator 506 calculates the entropy value of the first unanalyzed index based upon the following equation:

$$H(x) = -\Sigma_{i=1}^{n} P(x_i) \log_b P(x_i) \qquad (1)$$

In Equation (1) above, H(x) represents a calculated entropy, $x_i$ represents the bucket (e.g., storage) location, and $P(x_i)$ represents a probability that the subfingerprint 106 is stored at the bucket (e.g., storage) location. In some examples, the probability $P(x_i)$ that the subfingerprint 106 is stored at the bucket location is further based upon a quantity of subfingerprints stored in the corresponding bucket divided by the total amount of datapoints (e.g., subfingerprints) in the first unanalyzed index. In other examples, the probability $P(x_i)$ represents the probability that a value of the values 202 is selected for inclusion in the index. In some examples, the entropy calculator 506 can determine the entropy value for a plurality of indices.

The example seed manager 508 of the illustrated example of FIG. 5, included in or otherwise implemented by the hash seed generator 110, manages the generation and/or combination of hash seeds used to seed the hash function 108. In some examples such as the illustrated example of FIG. 5, the seed manager 508 further includes or otherwise implements the hash seed initializer 510, the seed selector 512, the seed pairing manager 514, and/or the seed selection validator 516.

The example hash seed initializer 510 of the illustrated example of FIG. 5, included in or otherwise implemented by the hash seed generator 110, initializes a plurality of integer based hash seeds. In some examples, the integer based hash seeds are generated randomly based on a random number generator included in the hash seed initializer 510. Additionally, in some examples, the integer based hash seeds can be preprocessed by the hash seed initializer 510 to determine a quantity of top (e.g., top 10%, top 20%, etc.) hash seeds based on calculated entropy values.

The example seed selector 512 of the illustrated example of FIG. 5, included in or otherwise implemented by the hash seed generator 110, selects one or more hash seeds and/or combinations of hash seeds to be stored in the hash seed data store 518 based upon one or more entropy values received from the entropy calculator 506. In some examples, the seed selector 512 selects the hash seeds and/or combinations of hash seeds associated with the observed maxima of entropy values calculated by the entropy calculator 506. In some examples, the seed selector 512 determines a subset of hash seeds (e.g., ten thousand hash seeds, one hundred thousand hash seeds, etc.) that result in the highest entropy values of the resulting bucket distributions when these hash seeds are used (e.g., on their own and not in combination with other hash seeds). In some such examples, the seed selector 512 initializes the subset of hash seeds (e.g., the subset of hash seeds being smaller than the full set) during a seed generation process, and various combinations of hash seeds within the subset are tested. In some examples, the seed selector 512 utilizes the hash seed which results in the highest entropy when used individually to initiate an optimized set of hash seeds. The seed selector 512 and/or the seed pairing manager 514 may then test other hash seeds in combination with the hash seed which resulted in the highest entropy to determine the best combination of two hash seeds. In some such examples, the seed selector 512 and/or the seed pairing manager 514 then select the best-performing combination of two hash seeds, and repeat the procedure to select a third hash seed. In some examples, the seed selector 512 and/or the seed pairing manager 514 repeat this procedure until a specified number of hash seeds have been selected for the optimized set (e.g., one hash seed per index).

The example seed pairing manager 514 of the illustrated example of FIG. 5, included in or otherwise implemented by the hash seed generator 110, pairs the combination of hash seeds selected by the seed selector 512 with the plurality of integer based hash seeds initialized by the hash seed initializer 510 to generate a plurality of hash seed combinations. In such examples, the plurality of hash seed combinations each include one additional hash seed when compared to the combination of hash seeds generated by the seed selector 512 (e.g., if a pair of hash seeds was generated by the seed selector 512, the plurality of hash seed combinations generated by the seed pairing manager 514 include three hash seeds).

In some examples, the seed pairing manager 514 maintains a plurality of possible expanded optimized sets of hash seeds, which represent possible hash seed combinations. In some such examples, the seed pairing manager 514 generates a plurality of sets of possible hash seed combinations, and utilizes the entropy calculator 506 to determine the entropies of data distribution between buckets that results from these possible hash seed combinations. In some examples, the seed pairing manager 514 adds possible hash seeds from the subset of hash seeds selected by the seed selector 512 to any already-selected hash seeds in the optimized set of hash seeds. In some examples, the seed pairing manager 514 selects a hash seed which provided the highest entropy value in combination with the current one or more hash seeds in the optimized set, and adds this hash seed to the optimized set. The seed pairing manager 514 can continue to test hash seed combinations until a specified number of hash seeds (e.g., one for each index) have been selected.

The example seed selection validator 516 of the illustrated example of FIG. 5, included in or otherwise implemented by the hash seed generator 110, retrieves a set (e.g., combination) of hash seeds stored from the hash seed data store 518. In such examples, the seed selection validator 516 can replace a first unreplaced hash seed in the combination of hash seeds with each of the integer based hash seeds initialized by the hash seed initializer 510. In some examples, this generates a plurality of modified hash seed combinations.

The seed selection validator 516 can further distribute the plurality of modified hash seed combinations to the bucket distributor 504, which determines bucket locations for the plurality of subfingerprints based upon each of the plurality of modified hash seed combinations.

Based on the returned entropy values, the seed selection validator 516 determines whether any of the plurality of entropy values exceed a previously observed maxima. In response to one of the plurality of entropy values exceeding the previously observed maxima, the seed selection validator 516 distributes the corresponding combination of hash seeds to the hash seed data store 518 for storage as the observed optimal combination of hash seeds. The seed selection validator 516, in some examples, repeats the replacement of one of the hash seeds in the combination of hash seeds for each of the hash seeds included in the combination, thus validating the previously observed maximal entropy value.

The seed selection validator 516 of the illustrated example enables improvements in hash seed selection that may result from replacing hash seeds that are selected earlier in generating an optimized set of hash seeds. For example, when generation of an optimized set of hash seeds is completed, the hash seed generator 110 knows that the last selected hash seed which was added to the optimized set is the best possible set in view of the prior selected hash seeds. However, the seed selection validator 516 may be able to improve upon this combination by testing out replacements for earlier selected hash seeds in the optimized set of hash seeds. For example, the seed selection validator 516 may determine that, based on the third, fourth, and fifth hash seeds in a five hash seed combination, the first hash seed can actually be improved by replacing it with another hash seed from the subset of hash seeds. While the original first hash seed may have been the best performing hash seed when tested individually, a different hash seed may perform better in combination with the other selected hash seeds. Thus, the seed selection validator 516 enables subsequent improvements to the optimized set of hash seeds that results when revisiting previously selected hash seeds in view of the other hash seeds that now exist in the optimized set.

The example hash seed data store 518 of the illustrated example of FIG. 5, included in or otherwise implemented by the hash seed generator 110, stores and/or allows for the retrieval (e.g., via a query) of data associated with one or more hash seeds and/or corresponding entropy values. In some examples, the hash seed data store 518 can store at least one of initialized hash seeds, hash seeds associated with maximal observed entropy values, combinations of hash seeds associated with maximal observed entropy values, among others.

The example audio sample data store 520 of the illustrated example of FIG. 5, included in or otherwise implemented by the hash seed generator 110, stores and/or allows for the retrieval (e.g., via a query) of data associated with one or more audio samples. In some examples, the audio sample data store 520 can store at least one of a plurality of audio samples, a plurality of fingerprints associated with the audio samples, and/or a plurality of subfingerprints associated with the fingerprints, among others. In some examples, the audio sample data store 520 stores at least one of the audio sample 102, the fingerprint 104, and/or the subfingerprint 106 after retrieval by the communication interface 502.

Further, at least one of the hash seed data store 518 or the audio sample data store 520 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). At least one of the hash seed data store 518 or the audio sample data store 520 may additionally or alternatively be implemented by one or more double data rate (DDR) memories, such as DDR, DDR2, DDR3, mobile DDR (mDDR), etc. At least one of the hash seed data store 518 or the audio sample data store 520 may additionally or alternatively be implemented by one or more mass storage devices such as hard disk drive(s), compact disk drive(s), digital versatile disk drive(s), etc. While in the illustrated example the hash seed data store 518 and the audio sample data store 520 are illustrated as a single databases, the hash seed data store 518 and the audio sample data store 520 may be implemented by any number and/or type(s) of databases. Further, the hash seed data store 518 and the audio sample data store 520 be located in the hash seed generator 110 or at a central location outside of the hash seed generator 110. Furthermore, the data stored in the hash seed data store 518 and the audio sample data store 520 may be in any data format such as, for example, binary data, comma delimited data, tab delimited data, structured query language (SQL) structures, etc.

While an example manner of implementing the hash seed generator 110 of FIGS. 1 and 4 is illustrated in FIG. 5, one or more of the elements, processes and/or devices illustrated in FIG. 5 may be combined, divided, re-arranged, omitted, eliminated and/or implemented in any other way. Further, the example communication interface 502, the example bucket distributor 504, the example entropy calculator 506, the example seed manager 508, the example hash seed initializer 510, the example seed selector 512, the example seed pairing manager 514, the example seed selection validator 516, and/or, more generally, the example hash seed generator 110 of FIGS. 1 and 4 may be implemented by hardware, software, firmware and/or any combination of hardware, software and/or firmware. Thus, for example, any of the example communication interface 502, the example bucket distributor 504, the example entropy calculator 506, the example seed manager 508, the example hash seed initializer 510, the example seed selector 512, the example seed pairing manager 514, the example seed selection validator 516, and/or, more generally, the example hash seed generator 110 of FIGS. 1 and 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 502, the example bucket distributor 504, the example entropy calculator 506, the example seed manager 508, the example hash seed initializer 510, the example seed selector 512, the example seed pairing manager 514, and/or the example seed selection validator 516 is/are hereby expressly defined to include a non-transitory computer readable storage device or storage disk such as a memory, a digital versatile disk (DVD), a compact disk (CD), a Blu-ray disk, etc. including the software and/or firmware. Further still, the example hash seed generator 110 of FIGS. 1 and 4 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
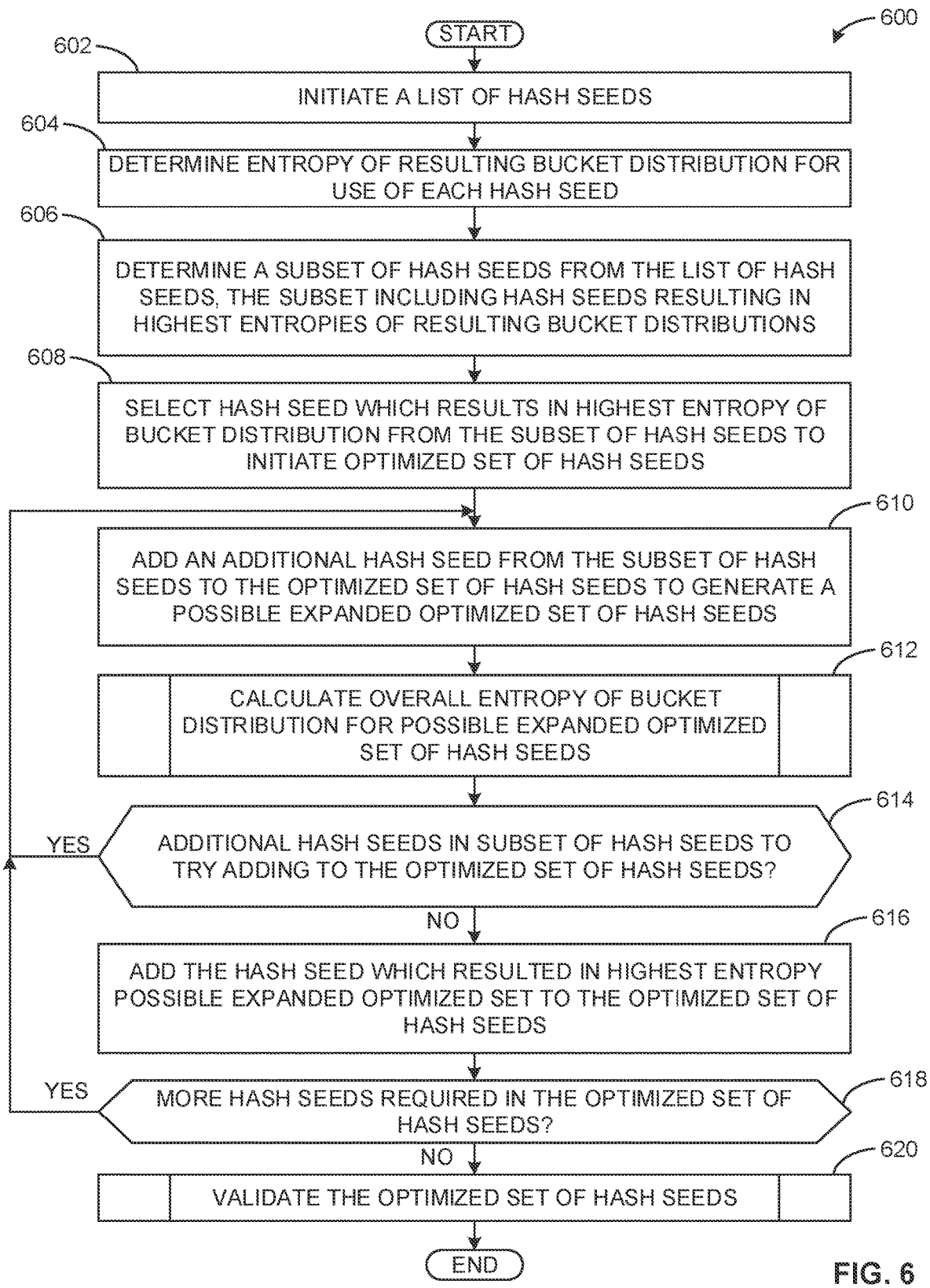
FIG. 6 is a flowchart representative of machine readable instructions which may be executed by the hash seed generator of FIGS. 1, 4, and 5 to determine hash seeds in accordance with the teachings of this disclosure.
Figure 7:
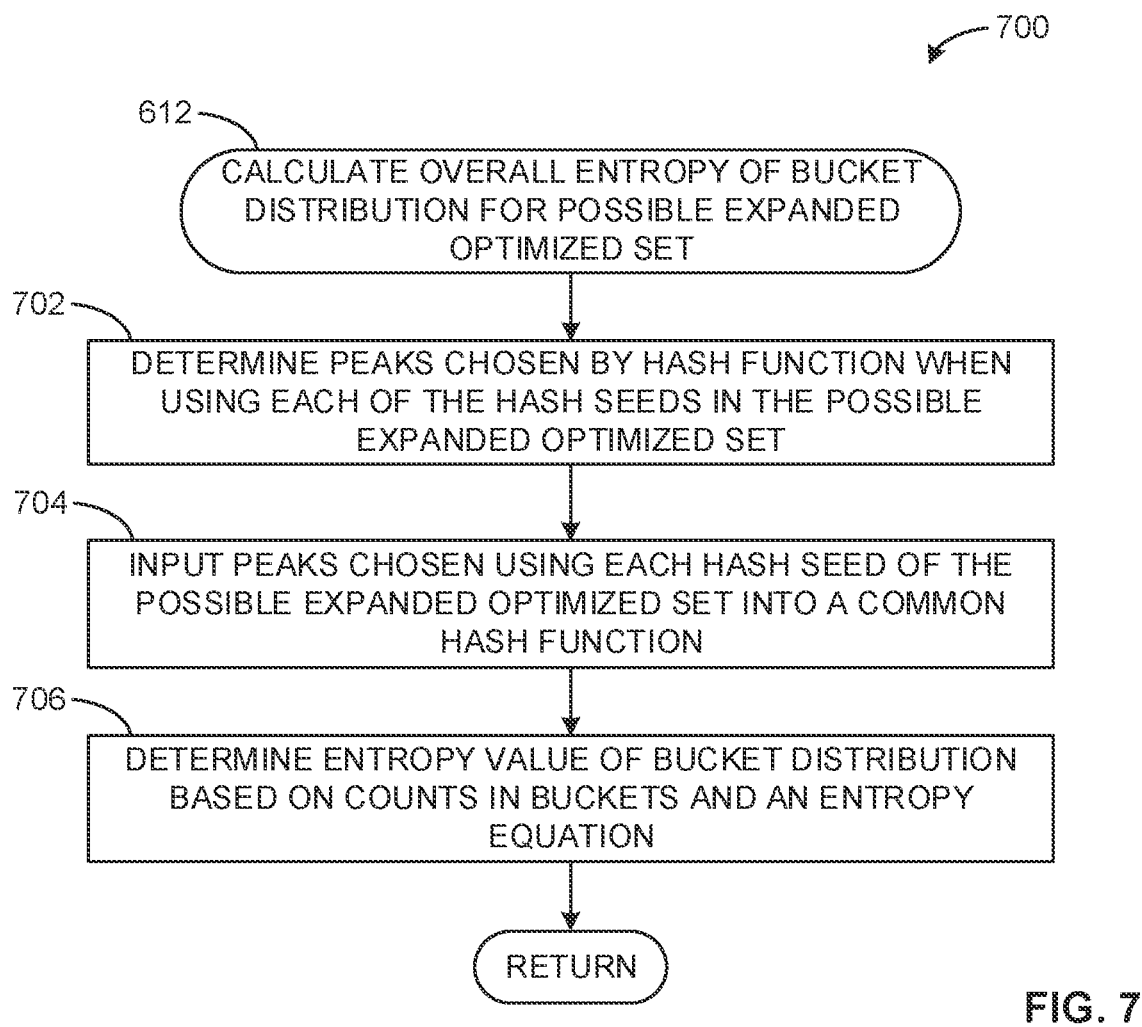
FIG. 7 is a flowchart representative of machine readable instructions which may be executed by the hash seed generator of FIGS. 1, 4, and 5 to calculate entropies of bucket distributions for possible expanded optimized hash seed sets in accordance with the teachings of this disclosure.
Figure 8:
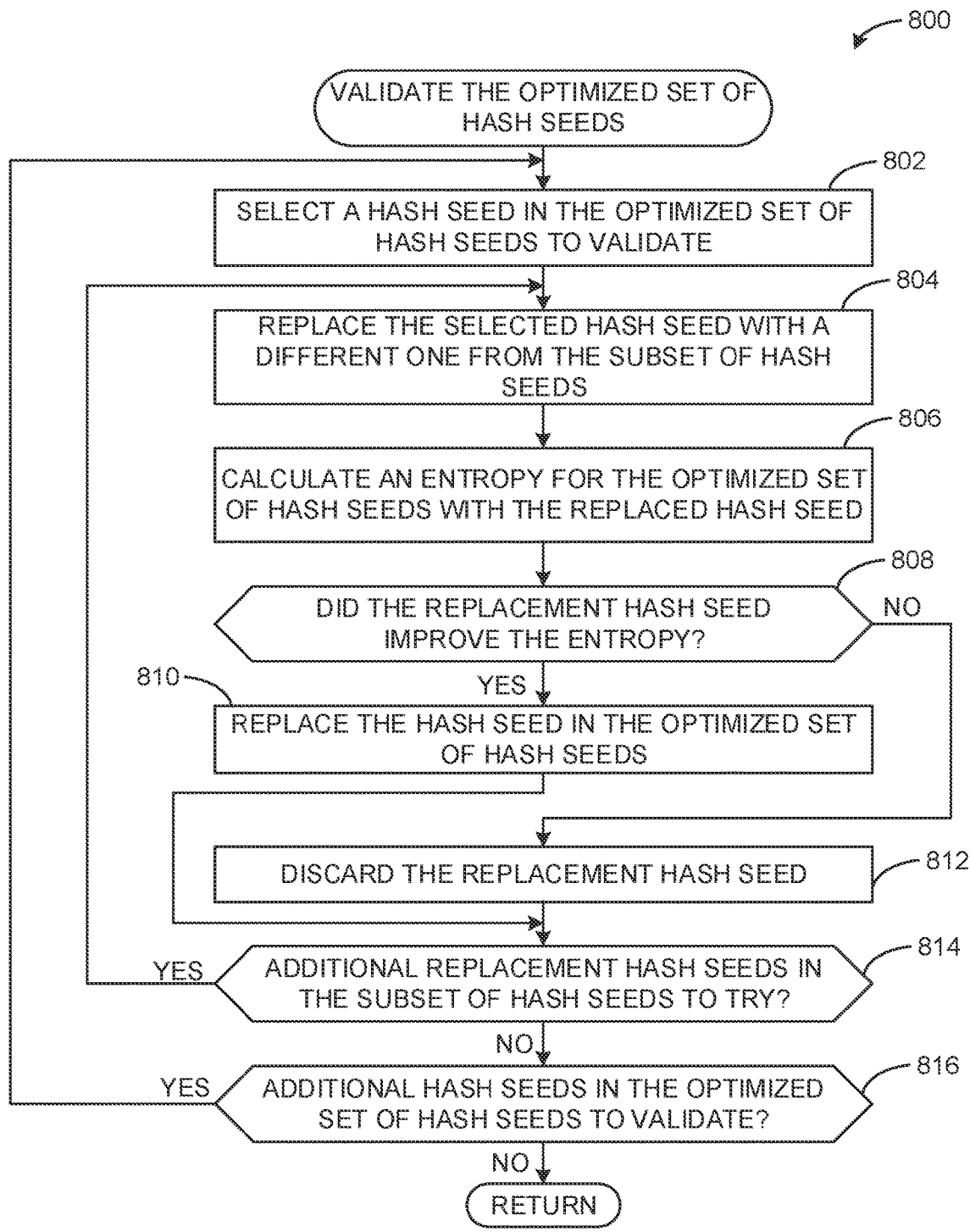
FIG. 8 is a flowchart representative of machine readable instructions which may be executed by the hash seed generator of FIGS. 1, 4, and 5 to validate an optimized set of hash seeds in accordance with the teachings of this disclosure.

Flowcharts representative of example hardware logic, machine readable instructions, hardware implemented state machines, and/or any combination thereof for implementing the hash seed generator 110 of FIGS. 1, 4, and 5 are shown in FIGS. 6-8. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6-8, many other methods of implementing the example hash seed generator 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example machine readable instructions 600 that may be executed by the hash seed generator 110 of FIGS. 1, 4, and 5 to determine hash seeds are illustrated in FIG. 6. With reference to the preceding figures and associated descriptions, the example machine readable instructions 600 of FIG. 6 begin with the hash seed generator 110 initiating a list of hash seeds (Block 602). In some examples, the hash seed initializer 510 initiates a list of hash seeds. For example, the hash seed initializer 510 can retrieve and/or generate a list of numbers (e.g., integer values) based on a random number generator included in the hash seed initializer 510.

At block 604, the hash seed generator 110 determines an entropy value of the resulting bucket distribution for the use of each of the hash seeds. In some examples, the entropy calculator 506 calculates an entropy value of the bucket distribution that would result when using each of the hash seed values on the list of hash seeds.

At block 606, the hash seed generator 110 determines a subset of hash seeds from the list of hash seeds, the subset including hash seeds resulting in the highest entropies of resulting bucket distributions. In some examples, the seed selector 512 selects a subset (e.g., ten thousand, one hundred thousand, etc.) of hash seeds to be used for selection of a combination of hash seeds. In some examples, the seed selector 512 selects the subset of hash seeds having the highest resulting entropies of bucket distributions that result from using the hash seeds, thereby limiting the list of hash seeds to a smaller, high-performing subset that can be analyzed to select a high performing (e.g., resulting in a high entropy) combination of hash seeds.

At block 608, the hash seed generator 110 selects a hash seed that results in the highest entropy of bucket distribution from the subset of hash seeds to initiate an optimized set of hash seeds. In some examples, the seed selector 512 selects a hash seed that results in the highest entropy of bucket distribution (e.g., the "best performing" hash seed) from the subset of hash seeds to initiate an optimized set of hash seeds.

At block 610, the hash seed generator 110 adds an additional hash seed from the subset of hash seeds to the optimized set of hash seeds to generate a possible expanded optimized set of hash seeds. In some examples, the seed pairing manager 514 adds an additional hash seed from the subset of hash seeds to the optimized set of hash seeds to generate a possible expanded optimized set of hash seeds. For example, the seed pairing manager 514 may select a hash seed which has not yet been added to the existing optimized set of hash seeds to determine how adding this hash seed affects the entropy of the resulting bucket distribution. In some examples, the seed pairing manager 514 creates a possible expanded optimized set of hash seeds for each possible new combination of a new hash seed. For example, if a first and second hash seed have already been included in the optimized set of hash seeds, the seed pairing manager 514 may create a plurality of possible expanded optimized sets of hash seeds by individually adding each of the remaining hash seeds in the subset of hash seeds to the optimized set of hash seeds and determining which of the added hash seeds resulted in the best entropy of the resulting bucket distribution.

At block 612, the hash seed generator 110 calculates an overall entropy of the bucket distribution for the possible expanded optimized set of hash seeds. In some examples, the entropy calculator 506 calculates an overall entropy value of the bucket distribution resulting from use of the possible expanded optimized set of hash seeds. Detailed instructions to calculate the overall entropy value of the bucket distribution resulting from use of the possible expanded optimized set of hash seeds are illustrated and described in connection with FIG. 7.

At block 614, the hash seed generator 110 determines whether there are additional hash seeds in the subset of hash seeds to try adding to the optimized set of hash seeds. In some examples, the seed selector 512 and/or the seed pairing manager 514 determines whether there are additional hash seeds in the subset of hash seeds to try adding to the optimized set of hash seeds. For example, the seed pairing manager 514 may determine whether a possible expanded optimized set of hash seeds has been generated for each of the remaining hash seeds in the subset of hash seeds (e.g., for each of the hash seeds not yet included in the optimized set). In response to there being additional hash seeds in the subset of hash seeds to try adding to the optimized set of hash seeds, processing transfers to block 610. Conversely, in response to there not being additional hash seeds in the subset of hash seeds to try adding to the optimized set of hash seeds, processing transfers to block 616.

At block 616, the hash seed generator 110 adds the hash seed which resulted in the highest entropy possible expanded set to the optimized set of hash seeds. In some examples, the seed pairing manager 514 adds the hash seed which resulted in the possible expanded set having the highest entropy of bucket distribution to the optimized set of hash seeds. Thus, the optimized set of hash seeds is expanded by an additional hash seed.

At block 618, the hash seed generator 110 determines whether there are more hash seeds required in the optimized set of hash seeds. In some examples, the seed pairing manager 514 determines whether there are additional hash seeds required in the optimized set of hash seeds. For example, the hash seed generator 110 may be configured to generate a total of six hash seeds, one for each of six indices. In such an example, the seed pairing manager 514 determines whether six hash seeds have been included in the optimized set of hash seeds. In response to there being more hash seeds required in the optimized set of hash seeds, processing transfers to block 610. Conversely, in response to there not being additional hash seeds required in the optimized set of hash seeds, processing transfers to block 620.

At block 620, the hash seed generator 110 validates the optimized set of hash seeds. In some examples, the seed selection validator 516 validates the optimized set of hash seeds. Detailed instructions to validate the optimized set of hash seeds are illustrated and described in connection with FIG. 8.

Example machine readable instructions 700 that may be executed by the hash seed generator 110 of FIGS. 1, 4, and 5 to calculate entropies of bucket distributions for possible expanded optimized hash seed sets are illustrated in FIG. 8. With reference to the preceding figures and associated descriptions, the example machine readable instructions 700 begin with the hash seed generator 110 determining peaks chosen by the hash function when using each of the hash seeds in the possible expanded optimized set (block 702). In some examples, the entropy calculator 506 determines the peaks (e.g., data values of the subfingerprint) chosen by the hash function when using each of the hash seeds in the possible expanded optimized set. For example, if the entropy calculator 506 uses a minimum-hash (minhash) algorithm, the entropy calculator 506 can determine which peaks resulted in the minimum output values when seeded with each of the hash seeds in the possible expanded optimized set.

At block 704, the hash seed generator 110 inputs peaks chosen using each hash seed of the possible expanded optimized set into a common hash function. In some examples, the entropy calculator 506 inputs the peaks chosen using each of the hash seed of the possible expanded optimized set into a common hash function to enable determination of the resulting entropy of the bucket distribution resulting from use of the possible expanded optimized set.

At block 706, the hash seed generator 110 determines an entropy value of the bucket distribution based on counts in buckets and an entropy equation. In some examples, the entropy calculator 506 determines an entropy value of a bucket distribution based on counts in buckets and an entropy equation. For example, the entropy calculator 506 can calculate the entropy of the bucket distribution using the following equation (previously presented in conjunction with FIG. 5):

$$H(x) = -\Sigma_{i=1}^{n} P(x_i) \log_b P(x_i) \qquad (1)$$

In Equation (1) above, H(x) represents a calculated entropy, $x_i$ represents the bucket (e.g., storage) location, and $P(x_i)$ represents a probability that the subfingerprint 106 is stored at the bucket (e.g., storage) location. In some examples, the probability $P(x_i)$ that the subfingerprint 106 is stored at the bucket location is further based upon a quantity of subfingerprints stored in the corresponding bucket divided by the total amount of datapoints (e.g., subfingerprints) in the first unanalyzed index. In other examples, the probability $P(x_i)$ represents the probability that a value of the values 202 is selected for inclusion in the index.

Example machine readable instructions 800 that may be executed by the hash seed generator 110 of FIGS. 1, 4, and 5 to validate an optimized set of hash seeds are illustrated in FIG. 8. With reference to the preceding figures and associated description, the example machine readable instructions 800 begin with the hash seed generator 110 selecting a hash seed in the optimized set of hash seeds to validate (Block 802). In some examples, the seed selection validator 516 selects a hash seed in the optimized set of hash seeds to validate.

At block 804, the hash seed generator 110 replaces the selected hash seed with a different one from the subset of hash seeds. In some examples, the seed selection validator 516 replaces the selected hash seed with a different one from the subset of hash seeds. In some examples, the seed selection validator 516 replaces the selected hash seed with a first one of the subset of hash seeds which has not yet been tested to replace the selected hash seed.

At block 806, the hash seed generator 110 calculates an entropy for the optimized set of hash seeds with the replaced hash seed. In some examples, the entropy calculator 506 calculates an entropy for a bucket distribution resulting from use of the optimized set of hash seeds with the replaced hash seed.

At block 808, the hash seed generator 110 determines whether the replacement hash seed improved the entropy of the optimized set of hash seeds. In some examples, the seed selection validator 516 determines whether the replacement hash seed improved the entropy of the optimized set of hash seeds. In response to the replacement hash seed improving the entropy, processing transfers to block 810. Conversely, in response to the replacement hash seed not improving the entropy, processing transfers to block 812.

At block 810, the hash seed generator 110 replaces the hash seed in the optimized set of hash seeds. In some examples, the seed selection validator 516 replaces the hash seed in the optimized set of hash seeds with the hash seed that resulted in the entropy improvement.

At block 812, the hash seed generator 110 discards the replacement hash seed. In some examples, the seed selection validator 516 discards the replacement hash seed by removing it from the optimized set of hash seeds and returning the original, selected hash seed (e.g., the hash seed replaced at block 804) to the optimized set of hash seeds. In some examples, the seed selection validator 516 labels the replacement hash seed as tested and/or used, to avoid re-testing the same hash seed if additional replacement hash seeds are to be tested.

At block 814, the hash seed generator 110 determines whether there are additional replacement hash seeds in the subset of hash seeds to try (e.g., to use as a replacement for the selected hash seed). In some examples, the seed selection validator 516 determines whether there are additional replacement hash seeds in the subset of hash seeds to try. For example, the seed selection validator 516 can determine whether there are hash seeds in the subset of hash seeds that have not yet been discarded (e.g., from already having been attempted as replacement hash seeds). In response to there being additional replacement hash seeds in the subset of hash seeds to try, processing transfers to block 804. Conversely, in response to there not being additional replacement hash seeds in the subset of hash seeds to try, processing transfers to block 816.

At block 816, the hash seed generator 110 determines whether there are additional hash seeds in the optimized set of hash seeds to validate. In some examples, the seed selection validator 516 determines whether there are additional hash seeds in the optimized set of hash seeds to validate. In response to there being additional hash seeds to validate, processing transfers to block 802. Conversely, in response to there not being additional hash seeds to validate, processing returns to the machine readable instructions 600 and terminates.

Figure 9:
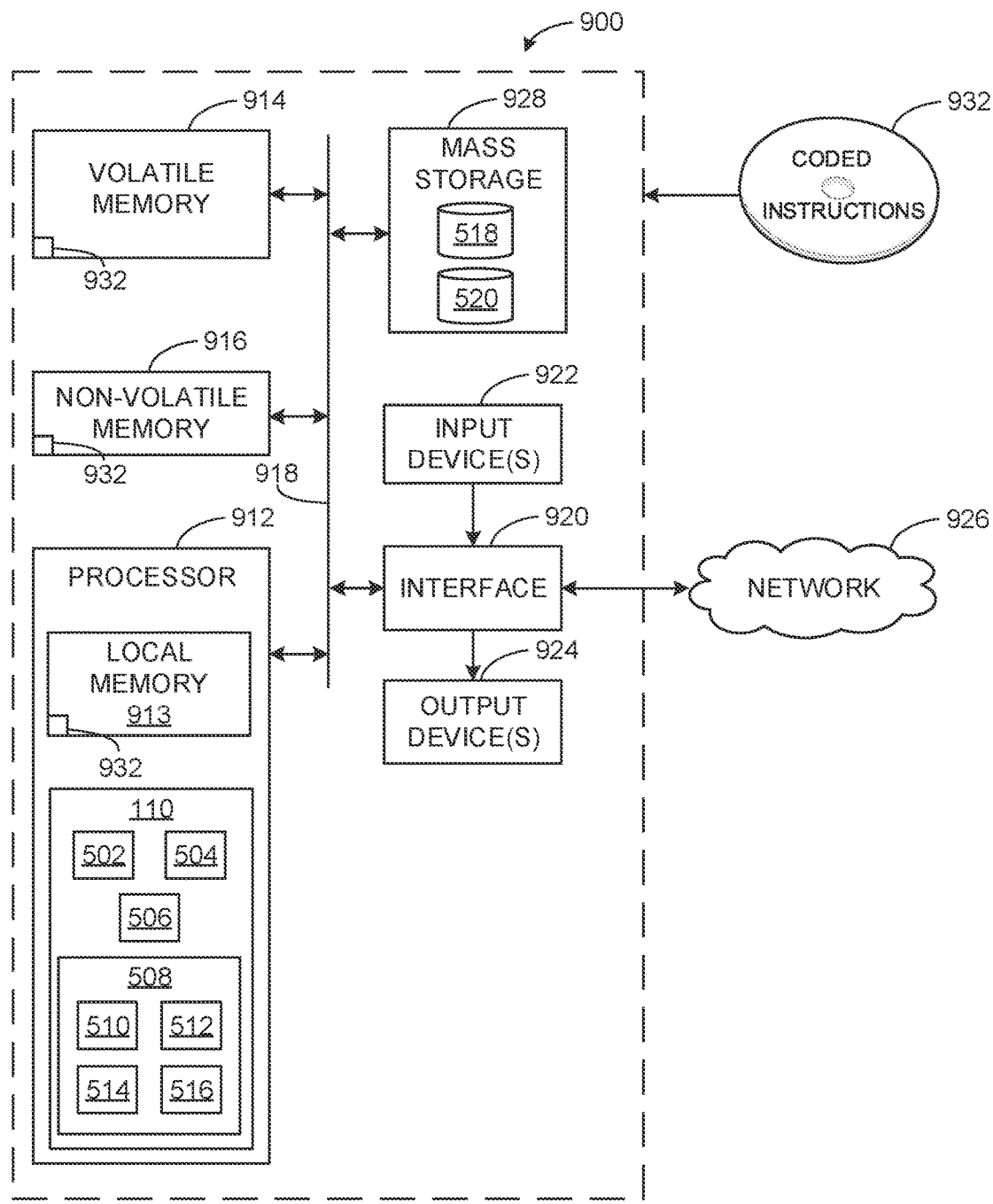
FIG. 9 is a block diagram of an example processing platform structured to execute the instructions of FIGS. 6-8 to implement the hash seed generator of FIG. 1.

FIG. 9 is a block diagram of an example processor platform 900 structured to execute the instructions of FIGS. 6-8 to implement the hash seed generator 110 of FIGS. 1, 4, and 5. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communication interface 502, the example bucket distributor 504, the example entropy calculator 506, the example seed manager 508, the example hash seed initializer 510, the example seed selector 512, the example seed pairing manager 514, the example seed selection validator 516, and/or, more generally, the example hash seed generator 110.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6-8 may be stored in the mass storage device 928, in the volatile memory 914, in the non-volatile memory 916, and/or on a removable non-transitory computer readable storage medium such as a CD or DVD.

FIGS. 10-15 are directed to procedures for utilizing a media indexing system as constructed in accordance with this disclosure. For example, after generating hash seeds in accordance with the procedures illustrated and described in connection with FIGS. 1-9, media data (e.g., fingerprints, subfingerprints, etc.) can be stored in one or more hash tables and/or retrieved from one or more hash tables based on techniques illustrated and described in connection with FIGS. 10-15. Further, while FIGS. 1-9 describe detail of the hash seed generator 110 of the media indexing system 402 of FIG. 4, FIGS. 10-15 describe detail of the indexer 404 of the media indexing system 402 of FIG. 4.

Some media indexing examples disclosed herein improve the efficiency and speed with which fingerprints can be added to one or more indices and improve the speed with which fingerprints can be compared to fingerprints stored in the one or more indices. Examples disclosed herein further improve efficiency by reducing memory utilization. Memory utilization is reduced by storing fewer values during the procedure to add and/or compare a fingerprint with the one or more indices, while still maintaining accuracy of the data.

Examples disclosed herein include accessing peak values in a subfingerprint and inputting the peak values into multiple subhash functions specific to an index. The minimum subhash output value that corresponds to a unique peak is then selected for each subhash function. By only selecting minimum subhash output values for unique peaks, the final global hash index representing the subfingerprint is a unique representation of the subfingerprint (e.g., as opposed to representing a repetitive peak value in multiple subhash outputs).

Techniques disclosed herein reduce memory usage by not storing permutations of the peak values, and by only storing a hashed triplet value representing the minimum subhash values. In some conventional implementations, peak values were identified and represented in a binary array that indicated locations of the peak values. In such implementations, the binary array was permuted, and the minimum non-zero index was selected to be part of the triplet. Techniques disclosed herein save time by not permuting such a large, sparse, binary array and instead inputting only indices associated with the peak values into subhash functions to determine the triplet value.

Further, processing speed is improved by not permuting the data and by executing subhash functions in parallel to determine a triplet value that accurately represents the original peak values. In some examples, parallel processing is implemented using single instruction, multiple data (SIMD) processing.

Moreover, accuracy is improved, as data truncation is only performed at the very end of the indexing procedure, after executing a global hash function on the triplet value. This final data truncation saves memory usage, while still maintaining sufficient accuracy and minimizing hash table collisions. By only truncating the final value, the truncation is equally likely to affect any peak value of the subfingerprint, so the minor loss of data is equally likely for each peak value, and not biased toward specific peaks. Conversely, in prior techniques, truncating the peak values directly (e.g., inputting the peak values into a hash function and then truncating this value), resulted in direct loss of upper bits of the data in an early stage of the hashing procedure.

Figure 10:
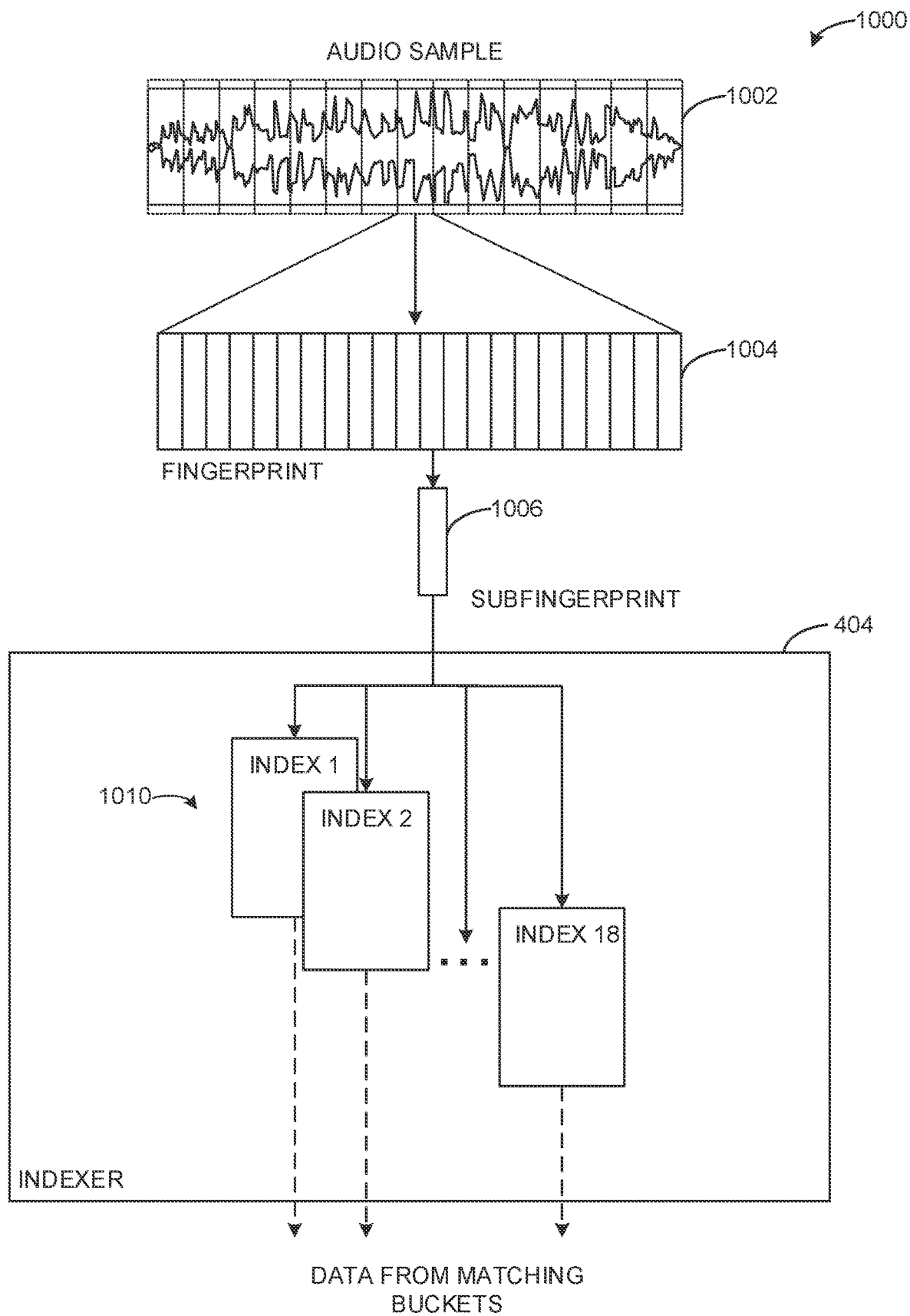
FIG. 10 is a schematic of an example procedure to store a media fingerprint in a plurality of indices or to query a fingerprint against a plurality of indices.

FIG. 10 is a schematic of an example procedure to store a media fingerprint in a plurality of indices or to query a fingerprint against a plurality of indices. The schematic 1000 includes an example audio sample 1002, an example fingerprint 1004, an example subfingerprint 1006, the example indexer 404 of FIG. 4, and the example plurality of indices 1010.

The example audio sample 1002 of the illustrated example of FIG. 10 is a segment of an audio recording. For example, the audio sample 1002 can be a brief segment of a song, a speech, a concert, etc. The audio sample 1002 can be represented by a plurality of fingerprints (e.g., indicated by the dashed rectangles over the audio sample), including the fingerprint 1004.

The example fingerprint 1004 of the illustrated example of FIG. 10 is a representation of features of a portion of the audio sample 1002. For example, the fingerprint 1004 may be a condensed digital summary of the audio sample 1002, including a number of the highest output values, a number of the lowest output values, frequency values, etc. In some examples, the fingerprint 1004 includes fast Fourier transform (FFT) values. However, the fingerprint 1004 can include peak values associated with any characteristic of the audio sample 1002.

The example subfingerprint 1006 of the illustrated example of FIG. 10 is a divided portion of the fingerprint 1004. For example, the fingerprint 1004 can be divided into a specified number of subfingerprints (e.g., ten, fifty, one-hundred, etc.), which can then be processed individually.

The example indexer 404 of the illustrated example of FIG. 10 processes the subfingerprint 1006. In some examples, the indexer 404 executes instructions to store data associated with the subfingerprint 1006 in the plurality of indices 1010. In some examples, the indexer 404 executes instructions to compare data associated with the subfingerprint 1006 against data stored in the plurality of indices 1010. For example, the indexer 404 may retrieve data from one or more of the plurality of indices 1010 indicating possible matches (e.g., subfingerprints that are identifiable) to the subfingerprint 1006. Detailed description of the indexer 404 is provided in the block diagram 1300 of FIG. 13.

The example plurality of indices 1010 of the illustrated example of FIG. 10 are locations where a representation of the subfingerprint 1006 is stored. In the illustrated example of FIG. 10, eighteen indices are represented, but any number of indices may be utilized. In some examples, ones of the plurality of indices 1010 are associated with different global hash functions that are used to hash values corresponding to the subfingerprint 1006 to assign the subfingerprint 1006 to locations in the ones of plurality of indices 1010. In some examples, ones of the plurality of indices 1010 are associated with different subhash functions that are used to determine sets of subhash values and subsequently determine minimum subhash values for the subhash functions.

Figure 11:
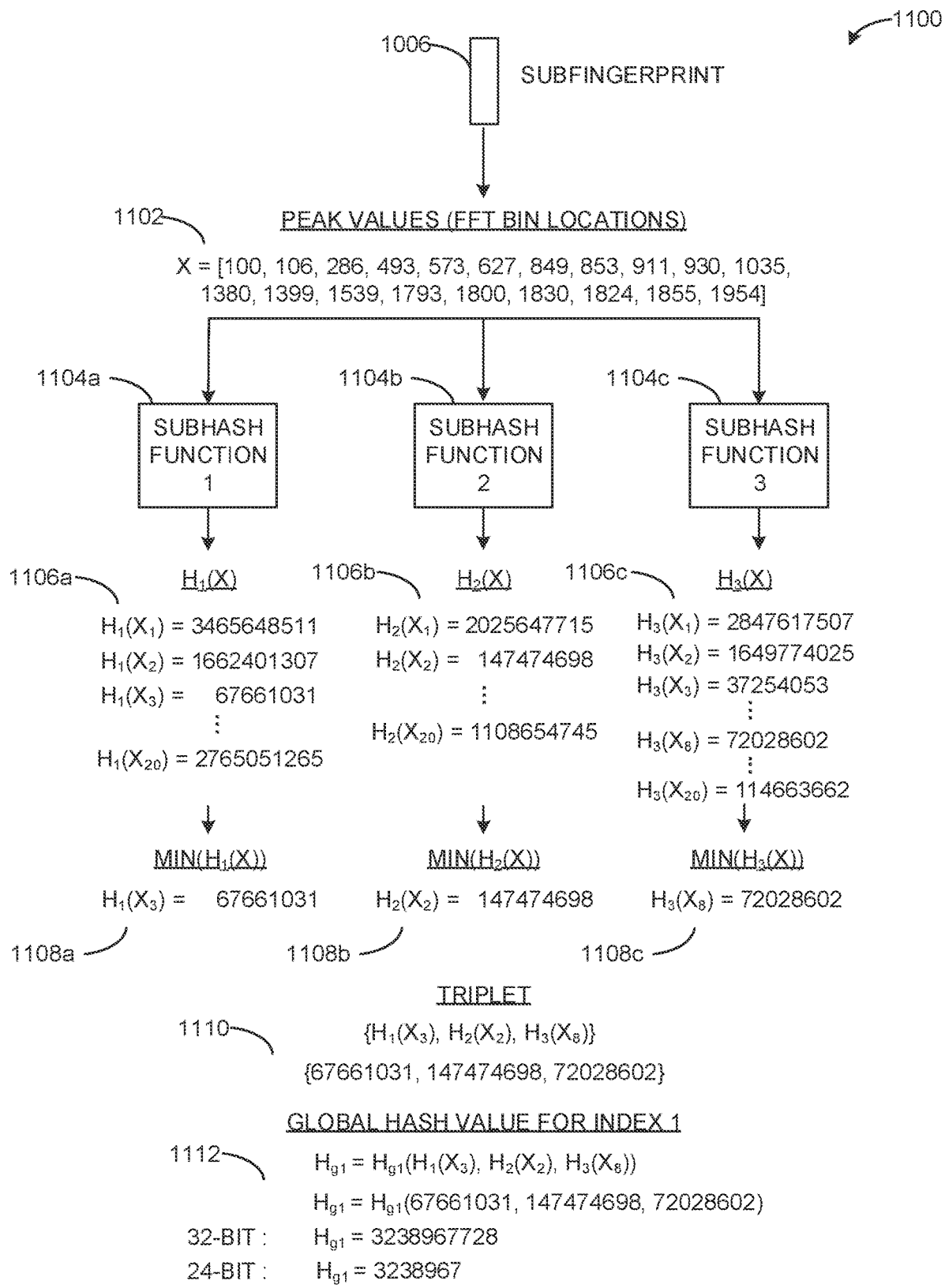
FIG. 11 is an example detailed schematic of a procedure to determine a global hash value associated with a media subfingerprint.

FIG. 11 is an illustration of an example procedure 1100 to store the subfingerprint 1006 in one of the plurality of indices 1010 of FIG. 10. The example procedure 1100 begins by determining example peak values 1102 (e.g., X) from the subfingerprint 1006. The peak values 1102 are associated with maximum amplitude values after time-frequency normalization and frequency scaling of the audio represented by the subfingerprint 1006. In some examples, the peak values 1102 are the twenty most prominent values. In some examples, the peak values 1102 are several maxima (e.g., the top twenty maxima) of the audio sample 1002. In such examples, two or more of the peak values 1102 may correspond to the same peak of the audio sample 1002. In some examples, the peak values 1102 represent any audio characteristics (frequency, amplitude, phase shift, etc.) that may be used to represent the audio associated with the subfingerprint 1006. In some examples, the peak values 1102 are determined when the fingerprint 1004 is generated by inputting the audio sample 1002 to a Fourier transform (e.g., an FFT) and then determining the peak values 1002 as the prominent (e.g., highest amplitude) features of the output of the transform. In the illustrated example of FIG. 11, twenty peak values are identified for the subfingerprint 1006.

After determining the peak values 1102, the peak values 1102 are input into example first, second, and third subhash functions 1104a, 1104b, 1104c (e.g., $H_1(x)$, $H_2(x)$, $H_3(x)$). The first, second, and third subhash functions 1104a, 1104b, 1104c transform the peak values 1102 to respective example first, second, and third sets of subhash values 1106a, 1106b, 1106c. In some examples, the first, second, and third subhash functions 1104a, 1104b, 1104c are specific to the index in which the subfingerprint 1006 is stored. The first, second, and third subhash functions 1104a, 1104b, 1104c can be any hash functions, and may transform the peak values 1102 into subhash values of any size (e.g., 32-bit, 24-bit, etc.). The first, second and third sets of subhash values 1106a, 1106b, 1106c, are listed only as abbreviated sets, depicting only some of the values of the first, second and third sets of subhash values 1106a, 1106b, 1106c. Full data pertaining to the procedure 200 is depicted in the table 1200 of FIG. 12.

After determining the first, second, and third sets of subhash values 1106a, 1106b, 1106c, an example first minimum subhash value 1108a, an example second minimum subhash value 1108b, and an example third minimum subhash value 1108c are determined. The first, second, and third minimum subhash values 1108a, 1108b, 1108c correspond to minimum values in the respective first, second and third sets of subhash values 1106a, 1106b, 1106c. The first minimum subhash value 1108a of the first set of subhash values 1106a is 67661031. The first minimum subhash value 1108a is thus associated with the third peak of the peak values 1102 (e.g., $X_3$). The second minimum subhash value 1108b of the second set of subhash values 1106b is 147474698. The second minimum subhash value 1108b is associated with the second peak of the peak values 1102 (e.g., $X_2$). The third minimum subhash value 1108c of the third set of subhash values 1106c would be expected to be 37254053, which is the minimum value of the set. However, to avoid creating a global hash value that represents the same peak more than once, duplicate uses of the same peak (e.g., $X_2$, in this example) are disallowed. Therefore, the third minimum subhash value 1108c of the third set of subhash values 1106c is the second smallest value, 72028602, which is associated with the eighth one of the peak values 1102 (e.g., $X_8$). In some examples, duplicate uses of the same one of the peak values 1102 may be allowable, in which case the third minimum subhash value 1108c would be 37254053.

The first, second, and third minimum subhash values 1108a, 1108b, 1108c are combined into an example triplet 1110. In some examples, the triplet 1110 is instead a combination of a different quantity of minimum subhash values (e.g., two, four, five, etc.). The example triplet 1110 is input into a global hash function (e.g., $H_{g1}$) that is specific to the index that the subfingerprint 1006 is being entered into. The global hash function outputs a global hash value 1112 for the index. In some examples, the global hash value 1112 is truncated to utilize less memory. For example, the global hash value 1112 can be truncated from a 32-bit value to a 24-bit value by removing the lower bits. The global hash value 1112 corresponds to a position of a bucket in the index that the subfingerprint 1006 is being entered into. In some examples, if the subfingerprint 1006 is to be stored in the index, data identifying the media may be stored at, or in association with, the bucket corresponding to the global hash value 1112. In some examples, if the subfingerprint 1006 is being used to identify unknown media, the global hash value 1112 can be used to retrieve data at a bucket corresponding to the global hash value 1112 for comparison with the subfingerprint 1006.

FIG. 12 is an example table 1200 representative of a dataset corresponding to the procedure 1100 of FIG. 11. The example table 1200 includes columns corresponding to the peak values 1102, the first set of subhash values 1106a, the second set of subhash values 1106b, and the third set of subhash values 1106c. In the first set of subhash values 1106a, the third number, 67661031 is emphasized, as it represents the first minimum subhash value 1108a. Similarly, in the second set of subhash values 1106b, the second number, 147474698 is emphasized, as it represents the second minimum subhash value 1108b. In the third set of subhash values 1106c, the third number, 37254053, represents an overall minimum subhash value, but is not utilized, as it corresponds to the same one of the peak values 1102 as the first minimum subhash value 1108a. Instead, the third minimum subhash value 1108c is the next lowest subhash value, 72028602.

The table 1200 also an example corresponding peak row 1202, depicting the peaks which correspond to the first, second and third minimum subhash values 1108a, 1108b, 1108c. The first minimum subhash value 1108a corresponds to the third peak, 286. The second minimum subhash value 1108b corresponds to the second peak, 106. The third minimum subhash value 1108c corresponds to the eighth peak, 853. The table 1200 further includes the triplet 1110, and the global hash value 1112 determined by inputting the triplet 1110 to the global hash function (e.g., $H_{g1}$).

Figure 13:
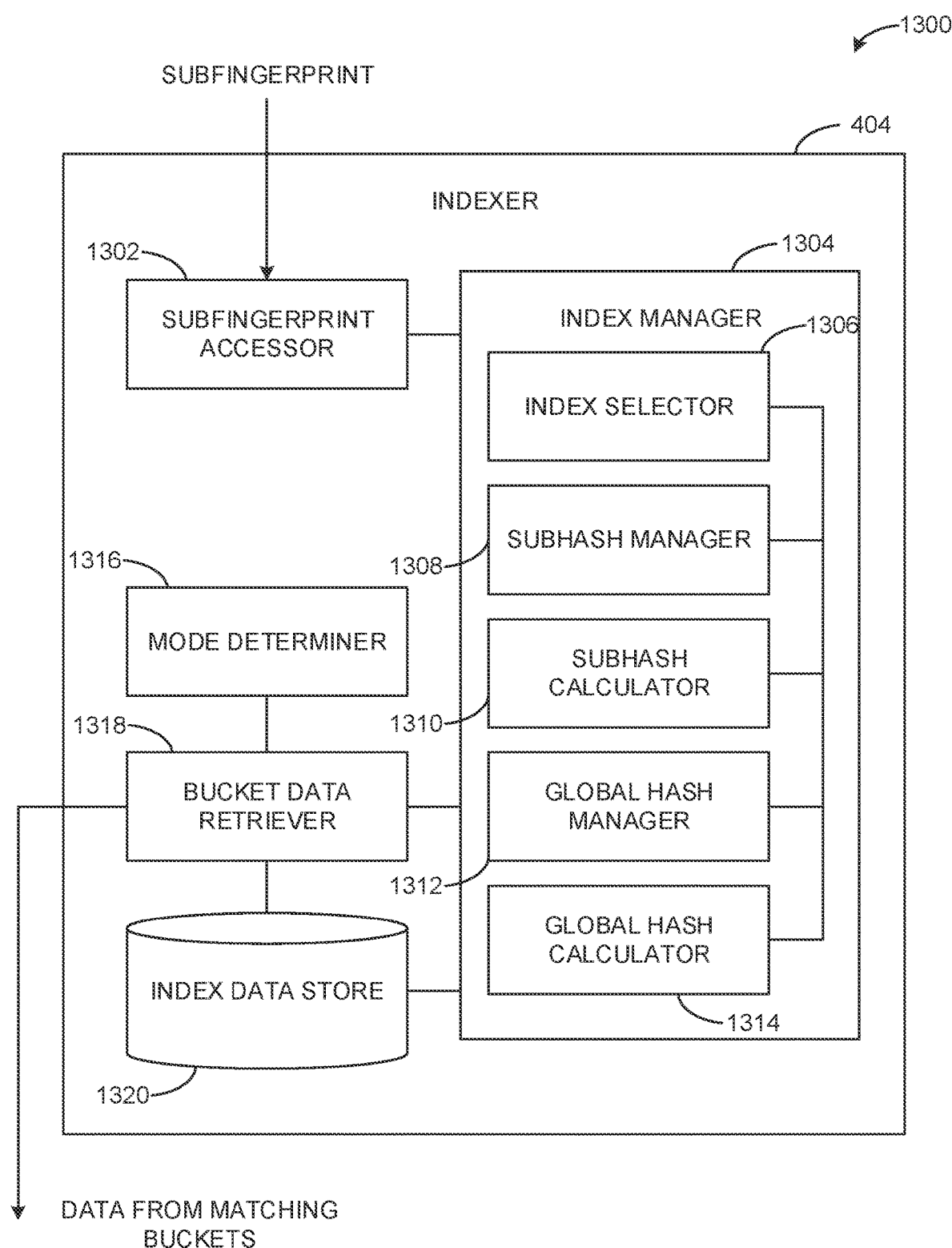
FIG. 13 is a block diagram of an example implementation of the indexer of FIGS. 4 and 10 structured to perform efficient media indexing and retrieval in accordance with the teachings of this disclosure.
Figure 14A:
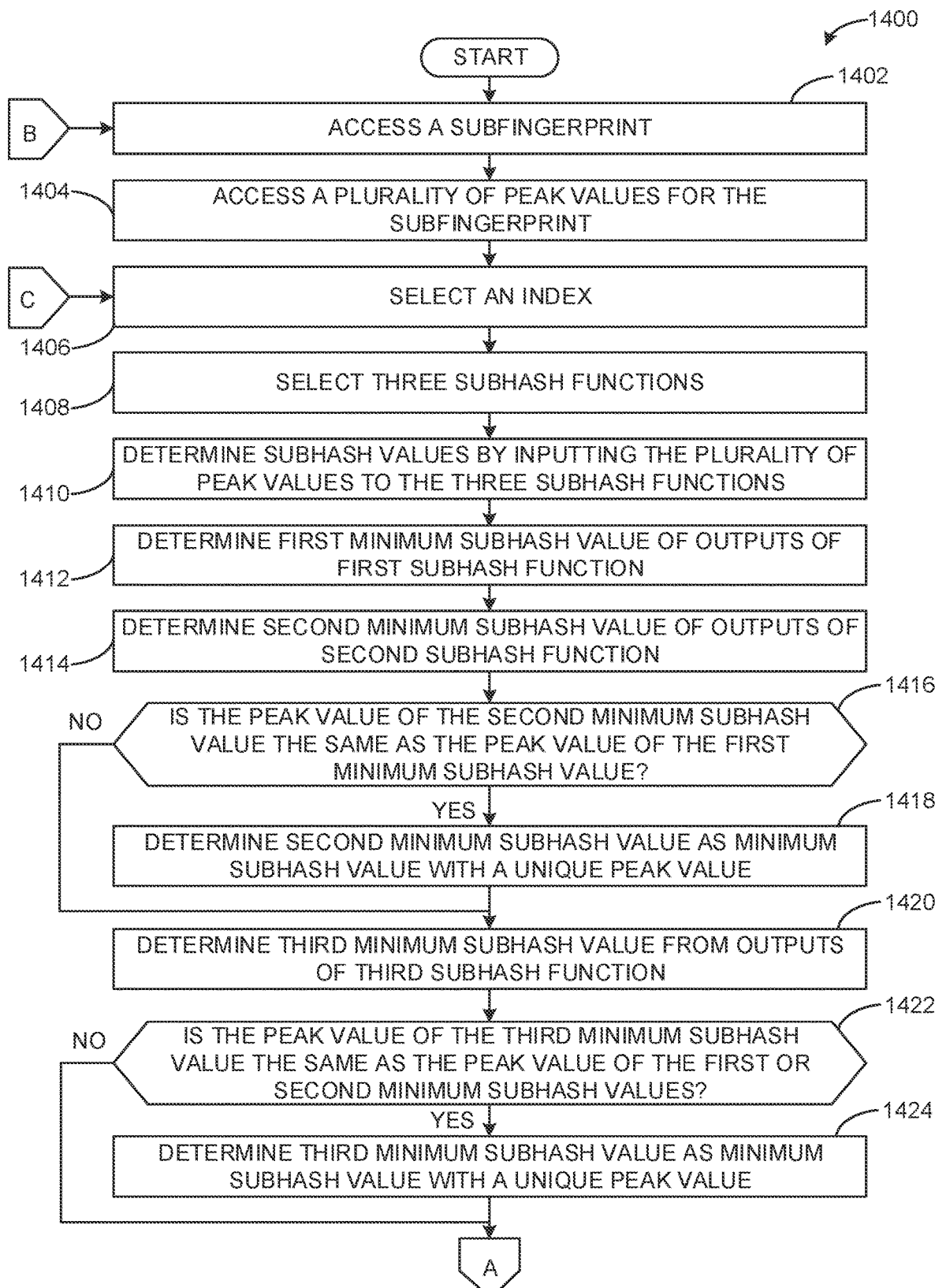
FIGS. 14A-14B are flowcharts representative of example machine readable instructions that may be executed to implement the indexer of FIGS. 4, 10, and 13 to perform efficient media indexing and retrieval.
Figure 14B:
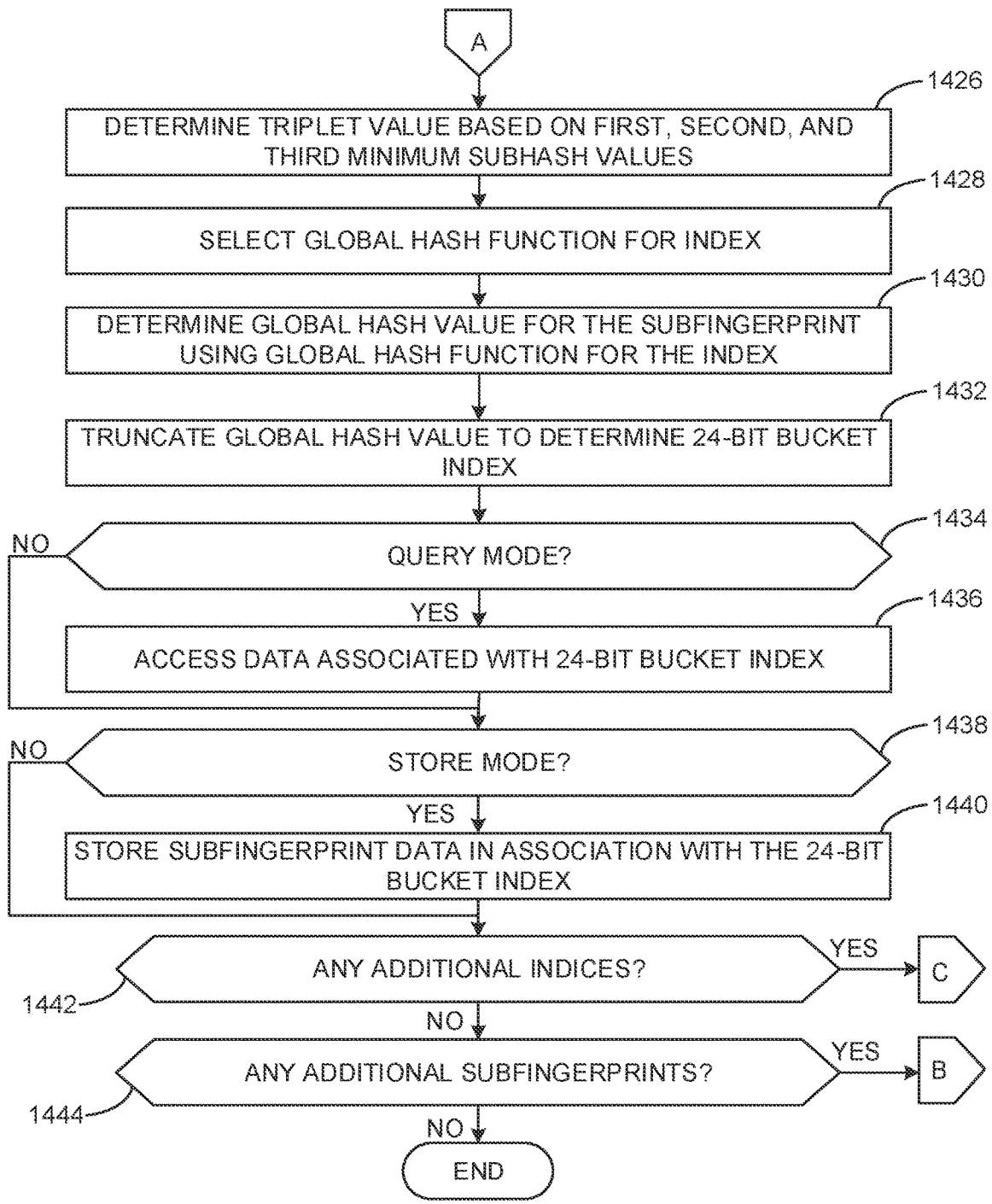

FIG. 13 is a block diagram of the indexer 404 of FIGS. 4 and 10 structured to execute the instructions of FIGS. 14A-14B to perform efficient media indexing and retrieval in accordance with the teachings of this disclosure. The example indexer 404 includes an example subfingerprint accessor 1302, an example index manager 1304, an example index selector 1306, an example subhash manager 1308, an example subhash calculator 1310, an example global hash manager 1312, an example global hash calculator 1314, an example mode determiner 1316, an example bucket data retriever 1318, and an example index data store 1320.

The example subfingerprint accessor 1302 accesses subfingerprints to be stored in and/or compared with data in one or more indices. In some examples, the subfingerprint accessor 1302 accesses one or more fingerprints and divides the one or more fingerprints into subfingerprints. In some examples, the subfingerprint accessor 1302 communicates subfingerprints to the index manager 1304. The example subfingerprint accessor 1302 accesses peak values for subfingerprints. For example, the subfingerprint accessor 1302 can access a number (e.g., twenty, thirty, etc.) of the highest amplitude values (e.g., maximum values after time-frequency normalization and frequency scaling) for individual subfingerprints.

The example index manager 1304 performs tasks to store subfingerprints in one or more indices, and/or compare subfingerprints with data stored in one or more indices. The index manager 1304 includes the index selector 1306, the subhash manager 1308, the subhash calculator 1310, the global hash manager 1312, and the global hash calculator 1314.

The example index selector 1306 identifies one or more indices stored in the index data store 1320 and/or otherwise accessible to the indexer 404. The index selector 1306 selects indices to store the subfingerprint in, and/or to compare the contents of the indices with the subfingerprint to identify media. In some examples, the index selector 1306 selects indices in order (e.g., the subfingerprint is stored in index one, and then subsequently stored in index two, etc.). The index selector 1306 can select indices in any order.

The example subhash manager 1308 manages subhash functions associated with the one or more indices stored in the index data store 1320 or otherwise accessible to the indexer 404. In some examples, the subhash manager 1308 selects a number of subhash functions (e.g., three subhash functions) to be assigned to one of the indices. In some examples, the subhash manager 1308 selects the subhash functions from a list of available subhash functions. In some examples, the subhash manager 1308 selects one or more same subhash functions for two or more indices.

The example subhash calculator 1310 calculates subhash values for peak values of subfingerprints. In some examples, the subhash calculator 1310 accesses peak values and inputs the peak values into subhash functions selected by the subhash manager 1308 to determine subhash values. In some examples, the same peak values are input into each of the subhash functions designated by the subhash manager 1308 for an index. In some examples, the subhash calculator 1310 determines minimum subhash values for each of the subhash functions. In some examples, the subhash calculator 1310 determines minimum subhash values as the lowest values output from the subhash function which do not correspond to a peak value already represented in another minimum subhash value. For example, the third minimum subhash value 1108c of the procedure 1100 of FIG. 11 and the table 1200 of FIG. 12 is not the smallest overall subhash value for the third set of subhash values 1106c, but rather the lowest value that does not correspond to a peak value already represented in another minimum subhash value (e.g., the value 37256053, the overall smallest subhash value of the third set of subhash values 1106c, corresponds to a peak that is already represented in the first minimum subhash value 1108a). In some examples, the subhash calculator 1310 determines a triplet value based on a first, second and third minimum subhash values. In some examples, if a different number of subhash functions are used for an index, the triplet may instead include fewer or more minimum subhash values (e.g., the triplet may instead be a quadruplet, the triplet may instead be a quintuplet, the triplet may instead be a couple, etc.).

The example global hash manager 1312 selects global hash functions for indices. In some examples, the global hash manager 1312 selects one global hash function for each of the indices. In some examples, the global hash manager 1312 selects global hash functions from a list of available global hash functions. In some examples, the global hash manager 1312 generates a global hash function using pre-defined parameters.

The example global hash calculator 1314 calculates global hash values based on subhash values. For example, the global hash calculator 1314 can calculate a global hash value pertaining to a triplet value calculated by the subhash calculator 1310. In some examples, the global hash calculator 1314 inputs a triplet value, and/or some other combination of subhash values, into a global hash function specific to the index to which the subfingerprint is to be stored and/or from which contents are being retrieved to identify a matching subfingerprint. The global hash calculator 1314 outputs a global hash value that can be utilized to identify a bucket in the index. In some examples, the global hash calculator 1314 truncates the global hash value to reduce the memory usage. The global hash calculator 1314 can communicate calculated global hash values to the bucket data retriever 1318 to retrieve data stored in a bucket (e.g., for comparison to the subfingerprint under analysis) and/or to communicate calculated global hash values to the index data store 1320 for storage of the subfingerprint at a bucket location corresponding to the global hash values.

The example mode determiner 1316 determines whether the indexer is in a store mode and/or in a query mode. In some examples, a subfingerprint accessed by the subfingerprint accessor 1302 can be determined to be unidentified, resulting in a query mode being activated (e.g., to compare the subfingerprint to data stored in one or more of the indices). In some examples, a subfingerprint accessed by the subfingerprint accessor 1302 can be determined to be identified, resulting in a store mode being activated (e.g., to store the subfingerprint in association with identifying information in one or more of the indices). In some examples, a user can indicate that the indexer 404 is to operate in the store mode and/or in the query mode.

The example bucket data retriever 1318 accesses data associated with buckets of one or more indices in response to accessing global hash values indicating locations of the buckets. For example, the global hash calculator 1314 can communicate a global hash value to the bucket data retriever 1318, resulting in the bucket data retriever 1318 accessing any data stored in the bucket corresponding to the global hash value. In some examples, the bucket data retriever accesses data corresponding to buckets of the one or more indices in the index data store 1320, and/or in any other location accessible to the indexer 404.

The example index data store 1320 is a storage location capable of storing indices, fingerprints, subfingerprints, subhash functions, subhash values, global hash functions, global hash values, and/or any other data associated with operations of the indexer 404. The index data store 1320 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The index data store 1320 can additionally or alternatively be implemented by one or more double data rate (DDR) memories, such as DDR, DDR2, DDR3, mobile DDR (mDDR), etc. The index data store 1320 can additionally or alternatively be implemented by one or more mass storage devices such as hard disk drive(s), compact disk drive(s) digital versatile disk drive(s), etc. While, in the illustrated example, the index data store 1320 is illustrated as a single database, the index data store 1320 can be implemented by any number and/or type(s) of databases. Furthermore, the data stored in the index data store 1320 can be in any data format such as, for example, binary data, comma delimited data, tab delimited data, structured query language (SQL) structures, etc.

In operation, the subfingerprint accessor 1302 accesses a subfingerprint including peak values for an audio sample. The index manager 1304 then utilizes the index selector 1306 to select indices in which the subfingerprint is to be stored, and/or to select indices from which contents will be retrieved to be compared to the subfingerprint. The subhash manager 1308 selects subhash functions for the indices, and the subhash calculator 1310 utilizes the subhash functions to calculate subhash values for the peak values. The subhash calculator 1310 determines minimum subhash values for each of the functions, and then generates a triplet value representing the three minimum subhash values for the three subhash functions (or other number, depending on the number of subhash functions). The global hash manager 1312 selects global hash values specific to the one or more indices, which the global hash calculator 1314 then inputs the triplet value into to determine a global hash value. Depending on whether the mode determiner 1316 determines that the indexer 404 is operating in a query mode and/or in a storage mode, either the bucket data retriever 1318 can retrieve data from buckets corresponding to the global hash value, or the index data store 1320 can store data associated with the subfingerprint to a bucket corresponding to the global hash value in an index.

While an example manner of implementing the indexer 404 of FIGS. 4 and 11 is illustrated in FIG. 13, one or more of the elements, processes and/or devices illustrated in FIG. 13 may be combined, divided, re-arranged, omitted, eliminated and/or implemented in any other way. Further, the example subfingerprint accessor 1302, the example index manager 1304, the example index selector 1306, the example subhash manager 1308, the example subhash calculator 1310, the example global hash manager 1312, the example global hash calculator 1314, the example mode determiner 1316, the example bucket data retriever 1318, the example index data store 1320 and/or, more generally, the example indexer 404 of FIG. 13 may be implemented by hardware, software, firmware and/or any combination of hardware, software and/or firmware. Thus, for example, any of the example subfingerprint accessor 1302, the example index manager 1304, the example index selector 1306, the example subhash manager 1308, the example subhash calculator 1310, the example global hash manager 1312, the example global hash calculator 1314, the example mode determiner 1316, the example bucket data retriever 1318, the example index data store 1320 and/or, more generally, the example indexer 404 of FIG. 13 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example subfingerprint accessor 1302, the example index manager 1304, the example index selector 1306, the example subhash manager 1308, the example subhash calculator 1310, the example global hash manager 1312, the example global hash calculator 1314, the example mode determiner 1316, the example bucket data retriever 1318, the example index data store 1320 and/or, more generally, the example indexer 404 of FIG. 13 is/are hereby expressly defined to include a non-transitory computer readable storage device or storage disk such as a memory, a digital versatile disk (DVD), a compact disk (CD), a Blu-ray disk, etc. including the software and/or firmware. Further still, the example indexer 404 of FIG. 13 may include one or more elements, processes and/or devices in addition to, or instead of, those illustrated in FIG. 13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the indexer 404 of FIG. 13 is shown in FIGS. 14A-14B. The machine readable instructions may be an executable program or portion of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIGS. 14A-14B, many other methods of implementing the example indexer 404 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 14A-14B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example machine readable instructions 1400 that may be executed by the indexer 404 are illustrated in FIGS. 14A-14B. With reference to the preceding figures and associated descriptions, the example machine readable instructions 1400 of FIG. 14A begin with the example indexer 404 accessing a subfingerprint (Block 1402). In some examples, the subfingerprint accessor 1302 accesses a subfingerprint.

At block 1404, the example indexer 404 accesses a plurality of peak values for the subfingerprint from an FFT representation. In some examples, the subfingerprint accessor 1302 accesses a plurality of peak values.

At block 1406, the example indexer 404 selects an index. In some examples, the index selector 1306 selects an index. In some examples, the index selector 1306 selects indices sequentially when storing a subfingerprint and/or comparing a subfingerprint to contents of the indices.

At block 1408, the example indexer 404 selects three subhash functions. In some examples, the subhash manager 1308 selects three subhash functions. For example, the subhash manager 1308 can select three different subhash functions from a list of subhash functions, and/or generate subhash functions based on predefined parameters.

At block 1410, the example indexer 404 determines subhash values by inputting the plurality of peak values to the three subhash functions. In some examples, the subhash calculator 1310 determines subhash values by inputting the plurality of peak values to the three subhash functions. In some examples, the subhash calculator 1310 may input the plurality of peak values into a different number of subhash functions, depending on how many subhash functions are selected by the subhash manager 1308.

At block 1412, the example indexer 404 determines a first minimum subhash value of outputs of the first subhash function. In some examples, the subhash calculator 1310 determines a first minimum subhash value of outputs of the first subhash function.

At block 1414, the example indexer 404 determines a second minimum subhash value of outputs of the second subhash function. In some examples, the subhash calculator 1310 determines a second minimum subhash value of outputs of the second subhash function.

At block 1416, the example indexer 404 determine whether the peak value of the second minimum subhash value is the same as the peak value of the first minimum subhash value. In some examples, the subhash calculator 1310 determines whether the peak value of the second minimum subhash value is the same as the peak value of the first minimum subhash value. In response to the peak value of the second minimum subhash value being the same as the peak value of the first minimum subhash value, processing transfers to block 1418. Conversely, in response to the peak value of the second minimum subhash value not being the same as the peak value of the first minimum subhash value, processing transfers to block 1420.

At block 1418, the example indexer 404 determines a second minimum subhash value as the minimum subhash value with a unique peak value. In some examples, the subhash calculator 1310 determines a second minimum subhash value as the minimum subhash value with a unique peak value.

At block 1420, the example indexer 404 determines a third minimum subhash value from outputs of the third subhash function. In some examples, the subhash calculator 1310 determines a third minimum subhash value from outputs of the third subhash functions.

At block 1422, the example indexer 404 determines if the peak value of the third minimum subhash value is the same as the peak value of the first or second minimum subhash values. In some examples, the subhash calculator 1310 determines if the peak value of the third minimum subhash value is the same as the peak value of the first or second minimum subhash values. In response to the peak value of the third minimum subhash value being the same as the peak value of the first or second minimum subhash values, processing transfers to block 1424. Conversely, in response to the peak value of the third minimum subhash value not being the same as the peak value of the first or second minimum subhash values, processing transfers to block 1426.

At block 1424, the example indexer 404 determines a third minimum subhash value as the minimum subhash value with a unique peak value. In some examples, the subhash calculator 1310 determines a third minimum subhash value as the minimum subhash value with a unique peak value.

The example machine readable instructions 1400 continue in FIG. 14B. With reference to the preceding figures and associated descriptions, the example machine readable instructions continue with the example indexer 404 determining a triplet value based on the first, second and third minimum subhash values (Block 1426). In some examples, the subhash calculator 1310 determines a triplet value based on the first, second and third minimum subhash values. In some examples, if there are more than three subhash functions utilized, the triplet value may instead include fewer, or more subhash values (e.g., two subhash values, four subhash values, etc.).

At block 1428, the example indexer 404 selects a global hash function for the index. In some examples, the global hash manager 1312 selects a global hash function for the index. For example, the global hash manager 1312 can select a global hash function from a list of available hash functions. In some examples, the global hash manager 1312 selects a global hash function for the index that is unique relative to other indices (e.g., by checking hash functions currently being used by other indices).

At block 1430, the example indexer 404 determines a global hash value for the subfingerprint using the global hash function for the index. In some examples, the global hash calculator 1314 determines a global hash value for the subfingerprint using the global hash function for the index.

At block 1432, the example indexer 404 truncates the global hash value to determine a 24-bit bucket index. In some examples, the global hash calculator 1314 truncates the global hash value to a 24-bit bucket index. In some examples, the global hash calculator 1314 truncates the global hash value to a different size (e.g., based on memory, efficiency, and accuracy requirements).

At block 1434, the example indexer 404 determines whether the indexer 404 is in query mode. In some examples, the mode determiner 1316 determines whether the indexer 404 is in query mode. In response to the indexer 404 being in query mode, processing transfers to block 1436. Conversely, in response to the indexer 404 not being in query mode, processing transfers to block 1438.

At block 1436, the example indexer 404 accesses data associated with the 24-bit bucket index. In some examples, the bucket data retriever 1318 accesses data associated with the 24-bit bucket index.

At block 1438, the example indexer 404 determines whether the indexer 404 is in store mode. In some examples, the mode determiner 1316 determines whether the indexer 404 is in store mode. In response to the indexer 404 being in store mode, processing transfers to block 1440. Conversely, in response to the indexer 404 not being in store mode, processing transfers to block 1442.

At block 1440, the example indexer 404 stores subfingerprint data in association with the 24-bit bucket index. In some examples, the index data store 1320 stores subfingerprint data in association with the 24-bit bucket index. For example, the index data store 1320 can store a reference from the bucket to a location where audio data and/or metadata (e.g., a title, genre, etc.) are stored for media associated with the subfingerprint.

At block 1442, the example indexer 404 determines if there are any additional indices for which the subfingerprint should be added and/or indices to which subfingerprint should be queried. In some examples, the index selector 1306 determines if there are any additional indices to for which the subfingerprint should be added and/or indices to which subfingerprint should be queried. In response to there being additional indices to which the subfingerprint should be added and/or indices to which subfingerprint should be queried, processing transfers to block 1406. Conversely, in response to there being no additional indices to which subfingerprint should be queried, processing transfers to block 1444.

At block 1444, the example indexer 404 determines whether there are any additional subfingerprints to process. In some examples, the subfingerprint accessor determines whether there are any additional subfingerprints to process. In response to there being additional subfingerprints to process, processing transfers to block 1402. Conversely, in response to there not being any additional subfingerprints to process, processing terminates.

Figure 15:
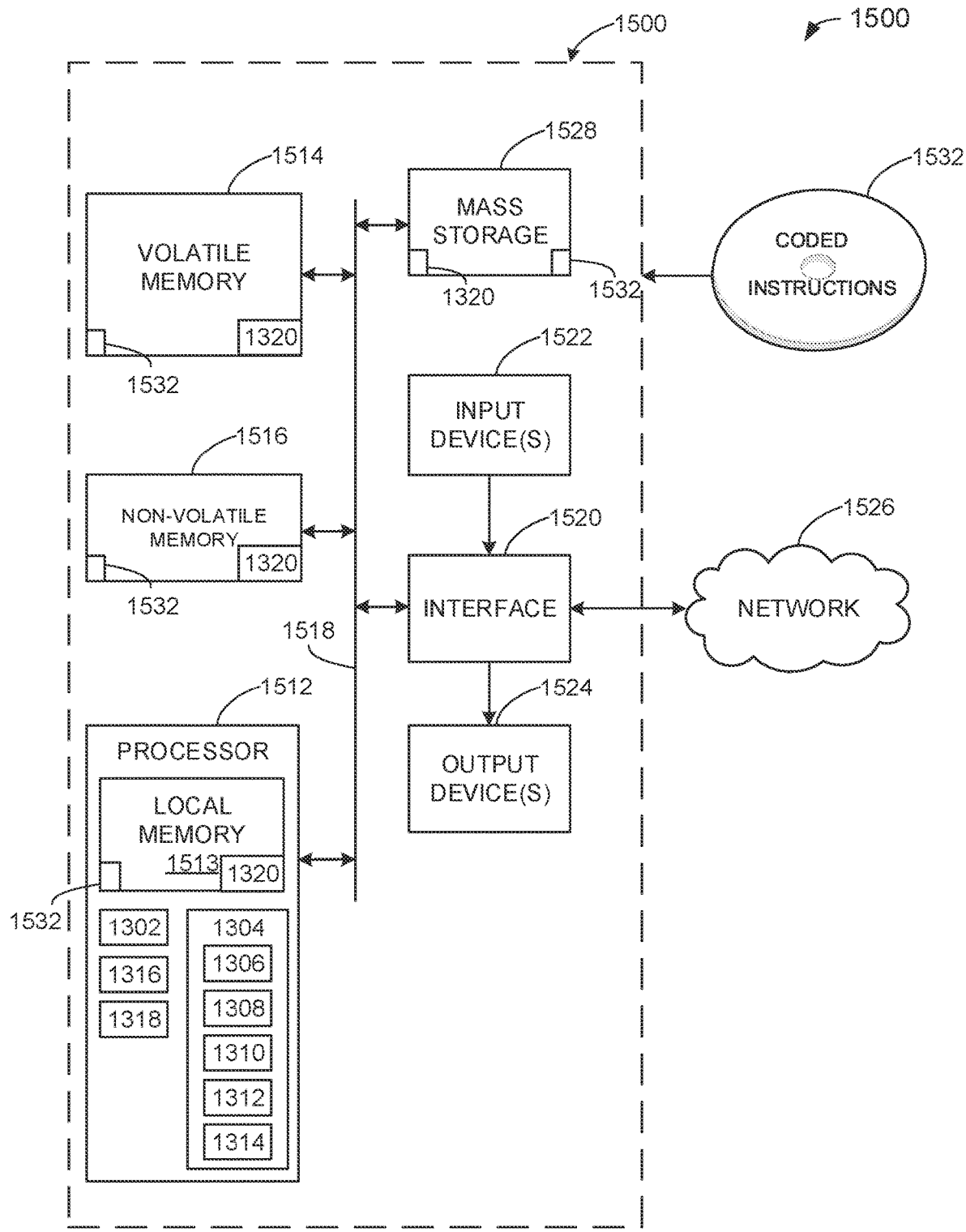
FIG. 15 is a block diagram of an example processor platform structured to execute the example machine readable instructions of FIGS. 14A-14B to implement the example indexer of FIGS. 4, 10 and 13.

FIG. 15 is a block diagram of an example processor platform 1500 structured to execute the instructions of FIGS. 14A-14B to implement the indexer 404 of FIGS. 4, 10, and 13. The processor platform 1500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example subfingerprint accessor 1302, the example index manager 1304, the example index selector 1306, the example subhash manager 1308, the example subhash calculator 1310, the example global hash manager 1312, the example global hash calculator 1314, the example mode determiner 1316, the example bucket data retriever 1318, the example index data store 1320 and/or, more generally, the example indexer 404 of FIGS. 4, 10, and 13.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 14A-14B may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed for efficient media indexing and retrieval. The disclosed methods, apparatus and articles of manufacture improve the efficiency of using a computing device by significantly increasing the speed with which fingerprints can be added to one or more indices, and improving the speed with which fingerprints can be compared to fingerprints stored in association with the one or more indices. Further, the disclosed methods, apparatus and articles of manufacture reduce memory utilization by storing fewer values during the procedure to add and/or compare a fingerprint with the one or more indices, while still maintaining the accuracy of the data. Further, techniques disclosed herein increase processing speed by enabling hashing operations without permuting the data and by executing subhash functions in parallel to determine a triplet value that accurately represents the original peak values.

From the foregoing, it will be appreciated that example methods, apparatus and articles of manufacture have been disclosed that select hash seeds to promote uniformity of a distribution of subfingerprints among buckets included in a hash table, leading to an increase in an entropy value associated with the uniformity of the distribution of data in the hash table. Conversely, selection of sub-optimal hash seeds, along with similarities among characteristics of audio samples considered, can result in highly irregular hash table bucket distributions, meaning that some locations (e.g., buckets) in the hash table(s) store significantly different quantities of data than other locations. In such examples, highly irregular hash table bucket distributions can cause an increase in computational resources as well as search time required to retrieve a subfingerprint from a hash table. Thus, promoting an even distribution of subfingerprints among buckets included in the hash table results in both decreased search times as well as a decrease in computational resources. The disclosed methods, apparatus and articles of manufacture are accordingly directed to one or more improvement(s) in the functioning of a computer.

Example methods, apparatus, systems, and articles of manufacture for efficient media indexing are disclosed herein. Further examples and combinations thereof include the following:

Example 1 includes an apparatus comprising a seed selector to select a first hash seed value based on a first entropy value calculated for a first bucket distribution resulting from use of the first hash seed value to store data in a first hash table, a seed pairing manager to select a second hash seed value to be used in combination with the first hash seed value based on a second entropy value calculated on a second bucket distribution resulting from use of the first hash seed value in combination with the second hash seed value, the second hash seed value selected based on the second entropy value being greater than a plurality of other entropy values associated with other bucket distributions resulting from other ones of the hash seed values in a subset of hash seed values used in combination with the first hash seed value, and a bucket distributor to store data in the first hash table based on the first hash seed value and a second hash table based on the second hash seed value.

Example 2 includes the apparatus of example 1, further including a hash seed initializer to determine the subset of hash seed values resulting in higher entropy values than other hash seed values of a set of hash seed values, the subset of hash seed values included in a set of hash seed values, the entropy values corresponding to a resulting bucket distribution when using ones of the hash seed values.

Example 3 includes the apparatus of example 1, wherein the first hash seed value is to seed a first index and the second hash seed value is to seed a second hash index.

Example 4 includes the apparatus of example 1, wherein the seed pairing manager is to select a third hash seed value to be used in combination with the first hash seed value and the second hash seed value based on a third entropy value calculated on a third bucket distribution resulting from use of the first hash seed value in combination with the second hash seed value and the third hash seed value.

Example 5 includes the apparatus of example 4, further including a seed selection validator to replace the second hash seed value with a fourth hash seed value, calculate a fourth entropy value for a fourth bucket distribution resulting from use of the first hash seed value in combination with the fourth hash seed value and the third hash seed value, and in response to the fourth entropy value being less than the third entropy value, reverse the replacement of the second hash seed value with the fourth hash seed value.

Example 6 includes the apparatus of example 1, wherein the first hash seed value and the second hash seed value are generated by a random number generator.

Example 7 includes the apparatus of example 1, wherein the first entropy value represents a uniformity of a distribution of data allocated between hash table buckets in the first hash table when using the first hash seed value.

Example 8 includes a computer readable storage medium comprising computer readable instructions that, when executed, cause at least one processor to select a first hash seed value based on a first entropy value calculated for a first bucket distribution resulting from use of the first hash seed value to store data in a first hash table, select a second hash seed value to be used in combination with the first hash seed value based on a second entropy value calculated on a second bucket distribution resulting from use of the first hash seed value in combination with the second hash seed value, the second hash seed value selected based on the second entropy value being greater than a plurality of other entropy values associated with other bucket distributions resulting from other ones of the hash seed values in a subset of hash seed values used in combination with the first hash seed value, and store data in the first hash table based on the first hash seed value and a second hash table based on the second hash seed value.

Example 9 includes the computer readable storage medium of example 8, wherein the instructions, when executed, further cause the at least one processor to determine the subset of hash seed values resulting in higher entropy values than other hash seed values of a set of hash seed values, the subset of hash seed values included in a set of hash seed values, the entropy values corresponding to a resulting bucket distribution when using ones of the hash seed values.

Example 10 includes the computer readable storage medium of example 8, wherein the first hash seed value is to seed a first index and the second hash seed value is to seed a second hash index.

Example 11 includes the computer readable storage medium of example 8, wherein the instructions, when executed, further cause the at least one processor to select a third hash seed value to be used in combination with the first hash seed value and the second hash seed value based on a third entropy value calculated on a third bucket distribution resulting from use of the first hash seed value in combination with the second hash seed value and the third hash seed value.

Example 12 includes the computer readable storage medium of example 11, wherein the instructions, when executed, further cause the at least one processor to replace the second hash seed value with a fourth hash seed value, calculate a fourth entropy value for a fourth bucket distribution resulting from use of the first hash seed value in combination with the fourth hash seed value and the third hash seed value, and in response to the fourth entropy value being less than the third entropy value, reverse the replacement of the second hash seed value with the fourth hash seed value.

Example 13 includes the computer readable storage medium of example 8, wherein the first hash seed value and the second hash seed value are generated by a random number generator.

Example 14 includes the computer readable storage medium of example 8, wherein the first entropy value represents a uniformity of a distribution of data allocated between hash table buckets in the first hash table when using the first hash seed value.

Example 15 includes a method comprising selecting a first hash seed value based on a first entropy value calculated for a first bucket distribution resulting from use of the first hash seed value to store data in a first hash table, selecting a second hash seed value to be used in combination with the first hash seed value based on a second entropy value calculated on a second bucket distribution resulting from use of the first hash seed value in combination with the second hash seed value, the second hash seed value selected based on the second entropy value being greater than a plurality of other entropy values associated with other bucket distributions resulting from other ones of the hash seed values in a subset of hash seed values used in combination with the first hash seed value, and storing data in the first hash table based on the first hash seed value and a second hash table based on the second hash seed value.

Example 16 includes the method of example 15, further including determining the subset of hash seed values resulting in higher entropy values than other hash seed values of a set of hash seed values, the subset of hash seed values included in a set of hash seed values, the entropy values corresponding to a resulting bucket distribution when using ones of the hash seed values.

Example 17 includes the method of example 15, wherein the first hash seed value is to seed a first index and the second hash seed value is to seed a second hash index.

Example 18 includes the method of example 15, further including selecting a third hash seed value to be used in combination with the first hash seed value and the second hash seed value based on a third entropy value calculated on a third bucket distribution resulting from use of the first hash seed value in combination with the second hash seed value and the third hash seed value.

Example 19 includes the method of example 18, further including replacing the second hash seed value with a fourth hash seed value, calculating a fourth entropy value for a fourth bucket distribution resulting from use of the first hash seed value in combination with the fourth hash seed value and the third hash seed value, and in response to the fourth entropy value being less than the third entropy value, reversing the replacement of the second hash seed value with the fourth hash seed value.

Example 20 includes the method of example 15, wherein the first hash seed value and the second hash seed value are generated by a random number generator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

We claim:

1. A computing device comprising:
   one or more processors; and
   a computer-readable storage medium comprising computer readable instructions that, when executed, cause the one or more processors to perform a set of operations comprising:
      generating a group of hash seeds, wherein the group comprises a first hash seed value, a second hash seed value, and a plurality of additional hash seed values;
      determining a first entropy value of a first bucket distribution, wherein the first bucket distribution is based on the first hash seed value and a first hash function;
      storing the first entropy value and the first hash seed value in a first hash table;
      determining a second entropy value of a second bucket distribution, wherein the second bucket distribution is based on using the first hash seed value in combination with the second hash seed value;
      determining that the second entropy value is greater than an entropy value associated with an additional bucket distribution, wherein the additional bucket distribution is based on one or more hash seed values in the plurality of additional hash seed values;
      based on determining that the second entropy value is greater than an entropy value associated with an additional bucket distribution, storing the second entropy value and the second hash seed value in a second hash table; and
      retrieving audio fingerprint data using the first hash table or the second hash table.

2. The computing device of claim 1, wherein the first hash seed value is associated with a first hash index, and wherein the second hash seed value is associated with a second hash index.

3. The computing device of claim 2, wherein the first hash index is different than the second hash index.

4. The computing device of claim 1, wherein generating a group of hash seeds comprises generating a list of hash seeds, and wherein the list comprises the first hash seed value, the second hash seed value, and at least one additional hash seed value of the plurality of additional hash seed values.

5. The computing device of claim 1, wherein at least one of the first hash seed value and the second hash seed value are based on predetermined list of integer values.

6. The computing device of claim 1, wherein at least one of the first hash seed value and the second hash seed value are generated by a random number generator.

7. The computing device of claim 1, wherein at least one of the first hash seed value or the second hash seed value is used to identify a location of one or more subfingerprints associated with the audio fingerprint data.

8. The computing device of claim 7, wherein at least one of the first entropy value or the second entropy value is associated with a distribution of the one or more subfingerprints.

9. A tangible non-transitory computer-readable storage medium comprising computer readable instructions that, when executed, cause one or more processors to perform a set of operations comprising:
   generating a group of hash seeds, wherein the group comprises a first hash seed value, a second hash seed value, and a plurality of additional hash seed values;
   determining a first entropy value of a first bucket distribution, wherein the first bucket distribution is based on the first hash seed value and a first hash function;
   storing the first entropy value and the first hash seed value in a first hash table;
   determining a second entropy value of a second bucket distribution, wherein the second bucket distribution is based on using the first hash seed value in combination with the second hash seed value;
   determining that the second entropy value is greater than an entropy value associated with an additional bucket distribution, wherein the additional bucket distribution is based on one or more hash seed values in the plurality of additional hash seed values;
   based on determining that the second entropy value is greater than an entropy value associated with an additional bucket distribution, storing the second entropy value and the second hash seed value in a second hash table; and
   retrieving audio fingerprint data using the first hash table or the second hash table.

10. The tangible non-transitory computer-readable storage medium of claim 9, wherein the first hash seed value is associated with a first hash index, and wherein the second hash seed value is associated with a second hash index.

11. The tangible non-transitory computer-readable storage medium of claim 10, wherein the first hash index is different than the second hash index.

12. The tangible non-transitory computer-readable storage medium of claim 9, wherein generating a group of hash seeds comprises generating a list of hash seeds, and wherein the list comprises the first hash seed value, the second hash seed value, and at least one additional hash seed value of the plurality of additional hash seed values.

13. The tangible non-transitory computer-readable storage medium of claim 9, wherein at least one of the first hash seed value and the second hash seed value are based on predetermined list of integer values.

14. The tangible non-transitory computer-readable storage medium of claim 9, wherein at least one of the first hash seed value and the second hash seed value are generated by a random number generator.

15. The tangible non-transitory computer-readable storage medium of claim 9, wherein at least one of the first hash seed value or the second hash seed value is used to identify a location of one or more subfingerprints associated with the audio fingerprint data.

16. The tangible non-transitory computer-readable storage medium of claim 15, wherein at least one of the first entropy value or the second entropy value is associated with a distribution of the one or more subfingerprints.

17. A computer-implemented method comprising:
   generating a group of hash seeds, wherein the group comprises a first hash seed value, a second hash seed value, and a plurality of additional hash seed values;
   determining a first entropy value of a first bucket distribution, wherein the first bucket distribution is based on the first hash seed value and a first hash function;
   storing the first entropy value and the first hash seed value in a first hash table;
   determining a second entropy value of a second bucket distribution, wherein the second bucket distribution is based on using the first hash seed value in combination with the second hash seed value;
   determining that the second entropy value is greater than an entropy value associated with an additional bucket distribution, wherein the additional bucket distribution is based on one or more hash seed values in the plurality of additional hash seed values;
   based on determining that the second entropy value is greater than an entropy value associated with an additional bucket distribution, storing the second entropy value and the second hash seed value in a second hash table; and
   retrieving audio fingerprint data using the first hash table or the second hash table.

18. The computer-implemented method of claim 17, wherein the first hash seed value is associated with a first hash index, and wherein the second hash seed value is associated with a second hash index.

19. The computer-implemented method of claim 17, wherein generating a group of hash seeds comprises generating a list of hash seeds, and wherein the list comprises the first hash seed value, the second hash seed value, and at least one additional hash seed value of the plurality of additional hash seed values.

20. The computer-implemented method of claim 17, wherein at least one of the first hash seed value or the second hash seed value is used to identify a location of one or more subfingerprints associated with the audio fingerprint data.

* * * * *